(12) United States Patent
Rochford et al.

(10) Patent No.: US 6,654,803 B1
(45) Date of Patent: *Nov. 25, 2003

(54) MULTI-PANEL ROUTE MONITORING GRAPHICAL USER INTERFACE, SYSTEM AND METHOD

(75) Inventors: Suzanne L. Rochford, Hull (CA); Larry A. Franko, Stittsville (CA); Allan Wille, Ottawa (CA); Luc Beaudoin, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/345,471

(22) Filed: Jun. 30, 1999

(51) Int. Cl.$^7$ .................................. G06F 15/173
(52) U.S. Cl. ................ 709/224; 709/223; 345/418; 345/735; 370/232; 370/254
(58) Field of Search ................ 709/223, 224; 345/735, 418; 370/254, 232

(56) References Cited

U.S. PATENT DOCUMENTS

| | | | | |
|---|---|---|---|---|
| 5,394,522 A | * | 2/1995 | Sanchez-Frank et al. | 345/735 |
| 5,659,768 A | * | 8/1997 | Forbes et al. | 715/517 |
| 5,751,964 A | | 5/1998 | Ordanic et al. | 395/200.54 |
| 5,768,552 A | * | 6/1998 | Jacoby | 345/418 |
| 5,845,277 A | * | 12/1998 | Pfeil et al. | 345/969 |
| 5,910,803 A | * | 6/1999 | Grau et al. | 345/734 |
| 5,926,463 A | * | 7/1999 | Ahearn et al. | 370/254 |
| 5,974,237 A | * | 10/1999 | Shurmer et al. | 709/223 |
| 6,047,320 A | * | 4/2000 | Tezuka et al. | 709/223 |
| 6,112,015 A | * | 8/2000 | Planas et al. | 345/735 |
| 6,209,033 B1 | * | 3/2001 | Datta et al. | 370/232 |
| 6,272,150 B1 | * | 8/2001 | Hrastar et al. | 370/254 |
| 6,304,273 B1 | * | 10/2001 | Bonnet | 345/440 |
| 6,438,110 B1 | * | 8/2002 | Rai et al. | 370/254 |
| 6,487,604 B1 | * | 11/2002 | Rochford et al. | 709/238 |
| 2002/0124004 A1 | * | 9/2002 | Reed et al. | 707/100 |

FOREIGN PATENT DOCUMENTS

| | | | |
|---|---|---|---|
| EP | 0515296 | 4/1992 | H04L/12/26 |
| EP | 0849912 | 8/1997 | H04L/12/24 |
| WO | 9852322 | 5/1998 | H04L/12/24 |
| WO | 9925085 | 11/1998 | H04J/3/14 |

OTHER PUBLICATIONS

Bay Networks, Inc., Apr. 1998, "Using Optivity Network Management System 8.1 Internetwork Applications", Chapters 3 and 4.

"Telecom Operations Map", Telemanagement Forum, Evaluation Version 1.1, Apr. 1999, pp. iii to xxii and 1 to 49.

* cited by examiner

Primary Examiner—Nabil El-Hady

(57) ABSTRACT

The present invention relates to a graphical user interface (GUI) for displaying historical and current performance information for a route in a communications network, the route having several paths between two end points. Performance data from the network is collected and processed to generate route and path performance data. The processed data is stored in a database. The GUI is embodied in a network management device which draws upon information stored in the database. In a preferred embodiment, the GUI displays a route panel showing the structure of the route, a timebar showing the time period for which information is displayed, a paths panel showing information about each path in a tabular format, a selected paths panel showing information about selected paths in a tabular format, and a performance panel showing performance data in a graph.

69 Claims, 30 Drawing Sheets

(23 of 30 Drawing Sheet(s) Filed in Color)

MULTI-PANEL ROUTE MONITORING GRAPHICAL USER INTERFACE, SYSTEM AND METHOD

FIELD OF THE INVENTION

The invention relates to network management and, in particular, to a system and method for the management of routes in telecommunications networks.

BACKGROUND OF THE INVENTION

In today's large telecommunications networks such as core networks used for Internet service providers (ISPs) or major corporate backbones, network management plays an important role in maintaining network stability, performance and efficiency. Network management is used to perform a variety of functions including the detection and correction of fault conditions, and the identification, configuration and monitoring of use, of network devices for cost allocation and performance evaluation.

Presently, the vast majority of networks are managed at the physical or device level by a centralized management entity commonly known as a network manager server (hereinafter "network manager") whereby devices in the network such as routers and physical layer interfaces are each individually polled by the network manager for status updates. However, in many situations, this process is not time-efficient.

For example, in the event of a congestion point causing unusual traffic delays or a failure causing a traffic interruption along a particular routing path, each network device located along that particular path and involved in the transmission of the traffic delayed or interrupted as a result of the congestion point or failure must be polled by the network manager to locate the source of the problem. Polling multiple devices each time a problem arises along a particular routing path is therefore time-consuming and as a result, substantially lengthens the time necessary to solve the problem.

Because polling of multiple network devices is time-consuming, most problems encountered in a network may deteriorate or improve by the time a network manager is able to track down the root of the problem, making it more difficult to ascertain its true nature. Moreover, in many cases, clients only report network problems long after their occurrence which, by that time, may not be visible problems anymore. This is particularly true of congestion points which are intermittent by their very nature and only occur in heavy traffic conditions.

In ascertaining the nature of a particular problem, it is often necessary for the network manager to determine which clients are affected and the manner in which those clients are affected. This typically requires a network-level analysis of each problem by considering the performance history of the particular routes and paths used by each client. A route is a static concept typically defined by a source start point and a destination end point in a network. By contrast, a path is a dynamic concept associated with a particular route. A path is defined as the set of network devices and their respective interfaces traversed by traffic travelling in a particular direction at any given point in time on the particular route.

However, current device-level management applications do not provide the necessary tools for efficiently monitoring routes and paths. As a result, these problems become virtually impossible to solve and may persist indefinitely.

Therefore, there is a need to provide network operators with the ability to monitor the performance history of routes and paths for efficient troubleshooting of problems arising in a network.

Another drawback of the use of device-level management is that it does not address real-time performance issues at a routing path level which often arise in a network as a result of problems occurring at the device level such as congestion points and link or equipment failures. Device-level management only deals with performance issues for which the network devices are individually responsible. However, this "device-level view" does not provide a path-level understanding of the overall real-time performance of all the devices defining a particular path of a particular route.

For example, in correcting a congestion problem, device-level management does not address whether the data transmitted on a particular source-destination route follows the path provisioned for it or whether it has been rerouted to an alternate path. Paths for a given route are typically dynamically selected by routing protocols.

When traffic is rerouted due to a failure in the network, another real-time performance issue not addressed by device-level management is whether the alternate path chosen has the requisite capacity for accommodating the traffic delayed or interrupted or whether the traffic as redirected will maintain the same level of service it had prior to being redirected. As network routes are currently sold to network clients with a specific quality of service (QoS), adequate configuration and path provisioning of network routes is becoming increasingly important. Therefore, there is a need for providing a network with adequate real-time performance monitoring and path provisioning capability for maintaining performance in a network and meeting ever increasing QoS demands.

The need to deal with device-level problems in a more time-efficient manner and address real-time performance issues arising as a result of the occurrence of device-level problems has triggered the emergence of what is now known in network management as trace routing. Trace routing applications allow some form of network-level management of paths and routes by relying on test messages to perform path discovery of specified routes. In particular, current trace routing implementations determine the path likely to be followed by traffic for a particular source-destination route by sending one or more test packets from the source node to the destination node and summarizing the results. However, this method has a number of disadvantages. First, the trace routing of any given source-destination route can only be performed from the source node. Another disadvantage is that most network devices are not properly instrumented to do this function and do not treat the test packets with the same priority than normal traffic. Therefore, the results obtained with this method are not truly representative of how the network devices handle their respective traffic in real-time. As a result, there has been a need for an improved network management system for managing and monitoring paths and routes in a network and also for monitoring the behaviour of network devices in real-time.

A solution to this problem has recently been proposed in U.S. application Ser. No. 09/288,565 filed Apr. 9, 1999 by Mark Robinson and Larry Franko, entitled "Routes and Paths Management", and assigned to the same applicant as this application which teaches a method and apparatus whereby information pertaining to the paths traversed in particular routes can be obtained. This application is hereby incorporated by reference in its entirety. The information is collected by polling the individual network elements and performing some manipulation of the data thus obtained to determine the paths taken for a particular route between two points in a network, for example between two IP addresses. This allows path and route level network management to be performed. This has provided a substantial improvement over the state-of-the art discussed above in which device-level management is performed.

Referring now to FIG. 2, a flowchart for a very simplified version of the method taught in the above-identified U.S. patent for the collection of data from a network is displayed. Firstly, the raw data is collected from the network using conventional network management data collection techniques. Next, this data is processed so as to identify paths of selected routes, and then the data is stored as a function of time in association with the identified paths and routes in a database.

While the above referenced application teaches how the route and path information may be collected, this is such a departure from the conventional information made available to network management applications that conventional GUI (graphical user interfaces) are incapable of making an effective use of this information. It would be advantageous to have a GUI which makes effective use of the improved route and path information.

SUMMARY OF THE INVENTION

It is an object of the invention to obviate or mitigate one or more of the above identified disadvantages and shortcomings of current network management applications.

In a broad aspect, the present invention provides a method for managing a network in which a route from a first point to a second point takes different paths. In this method, device-level status and performance information is collected from the network, the device-level status and performance information is then transformed into path and route information, parameters which characterize the state of each of a number of paths on the route are calculated, and the parameters of each of the paths is displayed graphically.

In another aspect, the present invention provides a method in a computer system for displaying network management information for a route on a network. The route has a plurality of paths between a first point and a second point, and the method comprises displaying a structure of the paths comprising the route.

In a further aspect, the present invention provides a method in a computer system for displaying network event information. In this method, a timebar representing time between a start time/date and an end time/date is displayed, and network event icons pictorially representing network events occurring in the network are displayed on the timebar. The location of the network event icons along the timebar visually communicates the time at which the network events were first detected.

Advantageously, the present invention provides a method of displaying route and path performance information for a network in an informative and easily-understood format. The present invention also allows a user to easily and interactively explore the inter-relationship between time, network events, route infrastructure and route/path performance, to facilitate isolation of potential and actual sources of problems in the network.

BRIEF DESCRIPTION OF THE DRAWINGS

The patent or application file contains at least one drawing executed in colour. Copies of this patent or patent application publication with coloured drawings will be provided by the Office upon request and payment of the necessary fee.

Preferred embodiments of the invention will now be described with reference to the attached drawings in which.

DETAILED DESCRIPTION OF THE PREFERRED EMBODIMENTS

Figure 1:
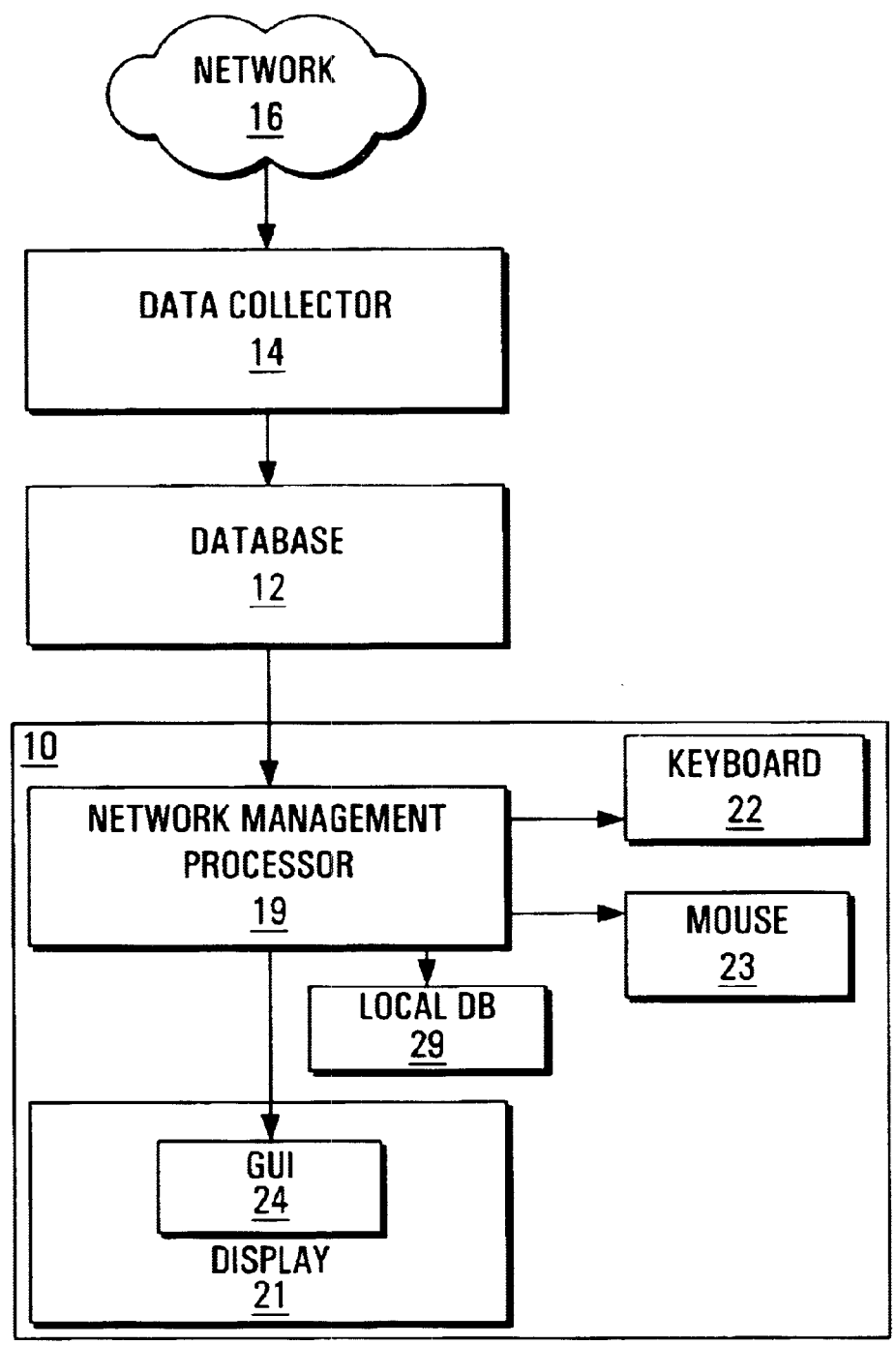
FIG. 1 is a block diagram of a network connected to a network management device featuring a graphical user interface according to an embodiment of the invention.
Figure 2:
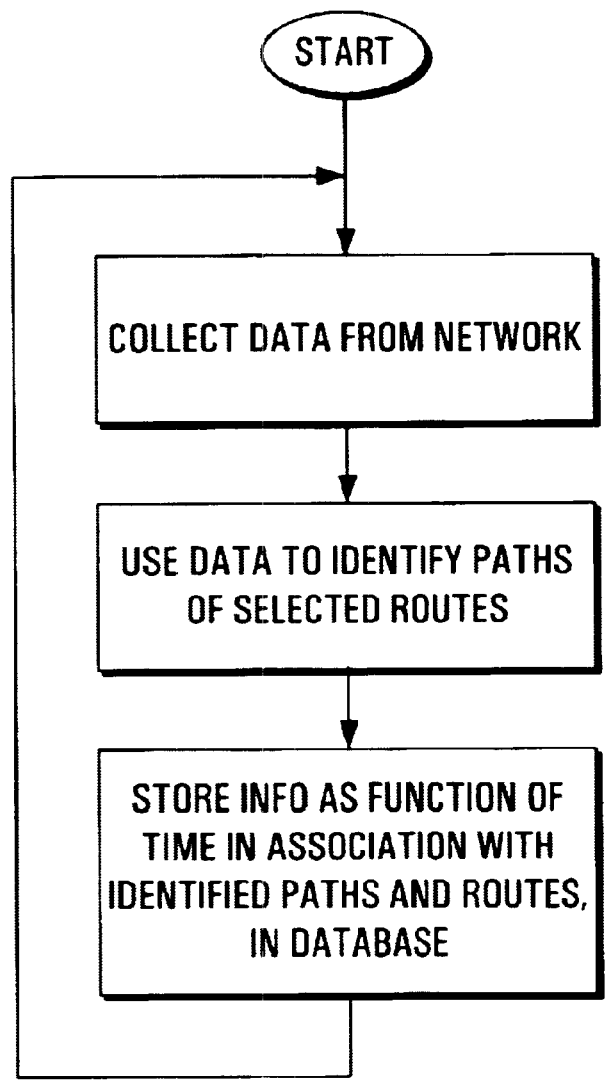
FIG. 2 is a flowchart showing how data may be collected from the network of FIG. 1.

Referring now to FIG. 1, an NMD (network management device) 10 is shown connected to a database 12 and a data collector 14 connected to a network 16 which might for example be an IP (Internet protocol) network. The data collector 14 is capable of collecting information from the network 16 for different routes and more particularly for all of the paths which make up different routes, and optionally processing this information to convert it to a more useful format. It may for example be the data collector 21 taught in the above referenced U.S. patent application Ser. No. 09/288,565. The information collected by the data collector 14, and optionally processed, is stored in the database 12. The database 12 may also have stored on it architectural, technical, and identification data for various routes in the network 16.

The NMD 10 has a network management processor 19 which is connected to a display 21, and user input devices such as a keyboard 22 and a mouse 23. If the display 21 is touch sensitive, then the display itself provides a user input device. The NMD 10 also has a local database 29. The NMD 10 is adapted to perform two functions. Firstly, it presents a GUI 24 on the display 21 to enable the presentation of information to a user in a coherent manner and to enable the receipt of instructions from the user through the user input devices 22, 23. Secondly, it performs processing on data stored in the database 12 in accordance with instructions received from the user through the GUI 24 to put it into a form suitable for display.

The network 16 is a network of interconnected communication devices permitting communication of data from one point in the network to another. Examples of networks are local area networks (LANs), wide area networks (WANs), the Internet, networks of microwave antenna base stations, satellite networks, or some combination or subset thereof. Regardless of the specific type, the network 16 comprises a number of nodes (not shown), interconnected by communication links (not shown). Nodes represent communication devices such as routers or antenna base stations, while the links represent any means of communication between two nodes, whether such communication takes place through copper wire, optical cable, microwaves, or any other means of communication. Each node may be directly connected to only one other node, or may be directly connected to a number of other nodes. Between two nodes which are directly connected, there may be one or more logical communication links. Each node has an interface associated with each link to which it is connected. As discussed earlier, a route is defined by a source start point and a destination end point in the network. There may be many actual courses taken by data traveling between the two end points in a route, and each of these is called a path.

Although one exemplary context for the application of the GUI 24 of the present invention has been described in detail above, it is to be understood that the GUI 24 of the present invention may be used in other contexts. One example would be where the GUI 24 is used to view historical data only, in which case it need only be associated with a display 21, an input device such as a keyboard 22 or mouse 23, a network management processor 19 and a database 12.

The preferred embodiment GUI 24 according to the present invention will now be described by first describing the appearance of the GUI, including each of its constituent panels, then describing how the various panels interact, the functionality behind the preferred embodiment GUI is then discussed, and finally, a demonstration, as shown in FIGS. 3 through 25, of the features of the preferred embodiment GUI is described.

APPEARANCE OF THE GUI

As shown in FIGS. 3 through 25 the GUI 24 according to a preferred embodiment of the present invention generally consists of a header 200 and a footer 202; a route panel 204, a performance panel 206 and a time panel 208 on the right side; and a paths panel 210 and selected-paths panel 212 on the left side. FIGS. 3 through 25 represent successive panels in a demonstration showing the features of the preferred embodiment GUI 24. The sample route displayed in the GUI 24 shown in FIGS. 3 through 25, is part of an IP communication network.

The Header

The header 200 of the preferred embodiment GUI 24 displays a route identifier 214, a menu bar 216, a tool bar 218 and a Trace New Route button 220. The route identifier 214 contains identifying information relating to the route of the network 16 presently being shown on the GUI 24. A different route may, for example, be selected by clicking on the Trace New Route button 220 at the right end of the tool bar 218. The menu bar 216 contains a series of drop-down menus (not shown) allowing the user to perform various functions relating to the GUI 24, such as loading, saving and printing of information, section of routes to be displayed, defining how data is viewed, help functions, etc. The toolbar 218 allows the user to perform similar functions as the menu bar 216 by clicking on an icon pictorially representing the function.

The Footer

The footer 202 displays a status bar providing information regarding the present status of the GUI 24. Such information may include for example, whether the user has selected an "Automatic refresh" feature 217, to update the information displayed on the GUI 24 as soon as any relevant parameters change, the date (not shown) or help information about the feature selected by the user (not shown).

In the preferred embodiment, each of the header 200 and footer 202 display a toolbar, menu bar and status bar, which are standard Windows* features. Each of the header 200 and footer 202 may, of course, also include other informational or functional elements in addition to those described above for the preferred embodiment GUI 24. Similarly, the header 200 and footer 202 may omit one or more of the elements described above. Indeed, the GUI according to the present invention may lack either the header, the footer, or both.

Route Panel

The route panel 204 displays the structure of the selected route in a meaningful, well-organized manner. The route panel 204 appears in the top of the right side of the preferred embodiment GUI 24 illustrated in FIGS. 3 through 25. Although the route panel 204 displays the entirety of the selected route, only a portion may be visible at any given time if the selected route is large. The user may view various portions of such a route through the use of scroll bars or pan and zoom, for example, as discussed further below.

Figure 3:
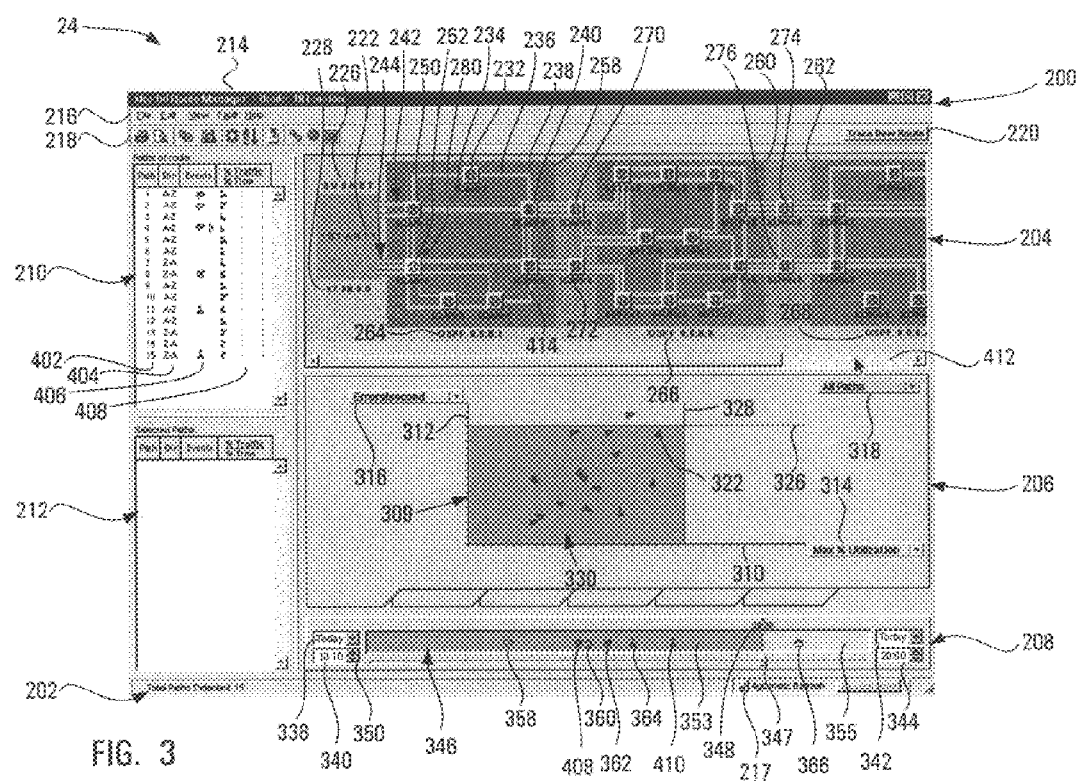
FIG. 3 is an illustration of a graphical user interface (GUI) according to an embodiment of the present invention showing example path and performance characteristics for a sample route, showing a start portion of the sample route in a route panel.
Figure 4:
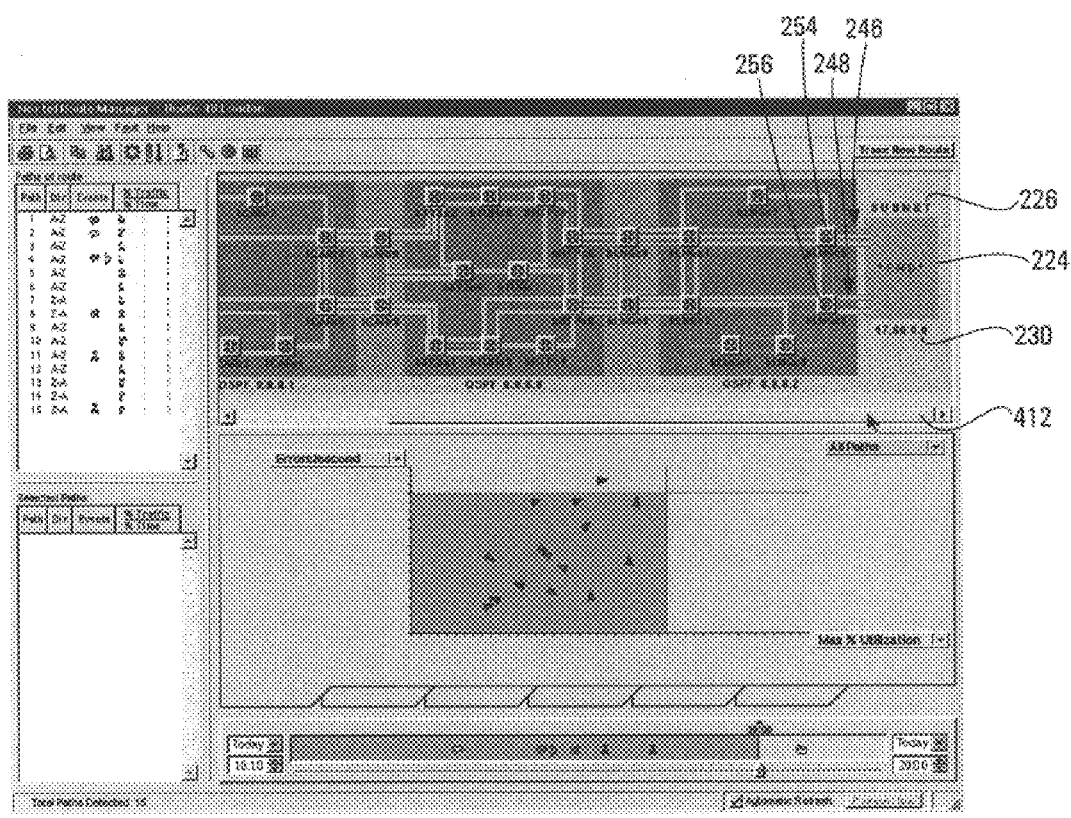
FIG. 4 is an illustration of the GUI of FIG. 3 showing an end portion of the sample route in the route panel.

As shown in FIG. 3, in the preferred embodiment, the start point 222 of the selected route is shown at the left end of this panel 204, while as shown in FIG. 4, wherein the only difference from FIG. 3 is that the right hand side of the route panel is selected to be shown, the end point 224 is shown at the right end of this panel. Each of the start point 222 and the end point 224 may either be individual nodes, or as shown in FIG. 3 through 24, may be subnets consisting of a selected portion of the network 16. As shown in FIGS. 3 and 4, the start point 222 and the end point 224 of the route have identifiers 226 identifying them as being either a node or a subnet. The network addresses 228 and 230 respectively, of the start point 222 and the end point 224 of the route are also displayed. In the illustrated example, since the sample route is part of an IP network, the addresses 228 and 230 are IP addresses.

In addition to the start point 222 and the end point 224 of the selected route, the route panel 204 also displays graphical representations of all of the nodes and logical links for all paths used by data traveling between these two points in the network in a selected time period.

In the illustrated example, each node is represented by a node icon, 232 for example, which may reflect a type of the node. Since the illustrated route is part of an IP network, each node in the route shown would typically be a router. A node name, 234 for example, assigned by a network administrator, may be displayed just below each node icon.

Logical links between any two given nodes are represented by lighter-coloured link lines 236 and 238 for example, appearing between two node icons, 232 and 240 for example, representing the nodes. The number of logical links between any two nodes is a function of the communication components in place between the two nodes, for example, the number of cables between the nodes, and/or the number of logical pathways along each cable as separated by time division multiplexing, or any other logical division, statistical multiplexing, wave division multiplexing or frequency division multiplexing, for example. In the preferred embodiment, the relative thicknesses of the link lines, 236 and 238 for example, are determined by the amount of traffic flowing through the logical link represented by the link line relative to the amount of traffic flowing on the selected route over the selected time period. In other words, if the proportion of traffic flowing through a given logical link relative to the total traffic flowing on the route is small, the corresponding link line will be narrow, whereas if a relatively large percentage of the total traffic flowing on the route travels across a given logical link, the corresponding link line will be thick. Link lines 242 and 244 show logical links between the start point 222 and the nodes 250 and 252 with which it communicates directly along the selected route. Link lines 246 and 248 show logical links between the end point 224 and the nodes 254 and 256 with which it communicates directly along the selected route.

To display the architecture of the route in a more meaningful manner, the nodes may also be spatially grouped in logical route groups which may or may not be geographic groupings. In the example illustrated in FIGS. 3 through 25, the nodes are displayed in Open Shortest Path First protocol (OSPF) route groups 258, 260 and 262. The portion of the route contained within a given route group 258, 260 or 262 is shown in a darker shade than the remainder of the route. The route groups are also identified by identifiers 264, 266 and 268 according to a number assigned by the network administrator. In the sample route shown in FIGS. 3 through 25, edge nodes 270, 272, 274 and 276 permit communication between the OSPF route groups 258, 260 and 262. Optionally, each route group may be closeable such that it is represented by a single container icon which represents a contained portion of the network.

As discussed in greater detail below, when a particular network event such as a threshold crossing alarm is ongoing at the time selected on a timebar 346, an affected portion of the route is visually distinguished. In the preferred embodiment, the affected portion of the route is highlighted and an event icon is displayed near a location of the event. In FIG. 3, the ongoing event is a threshold crossing, and as such, the node 252 at which the threshold crossing alarm was detected is highlighted in yellow, while a threshold crossing event icon 280 appears nearby.

Figure 5:
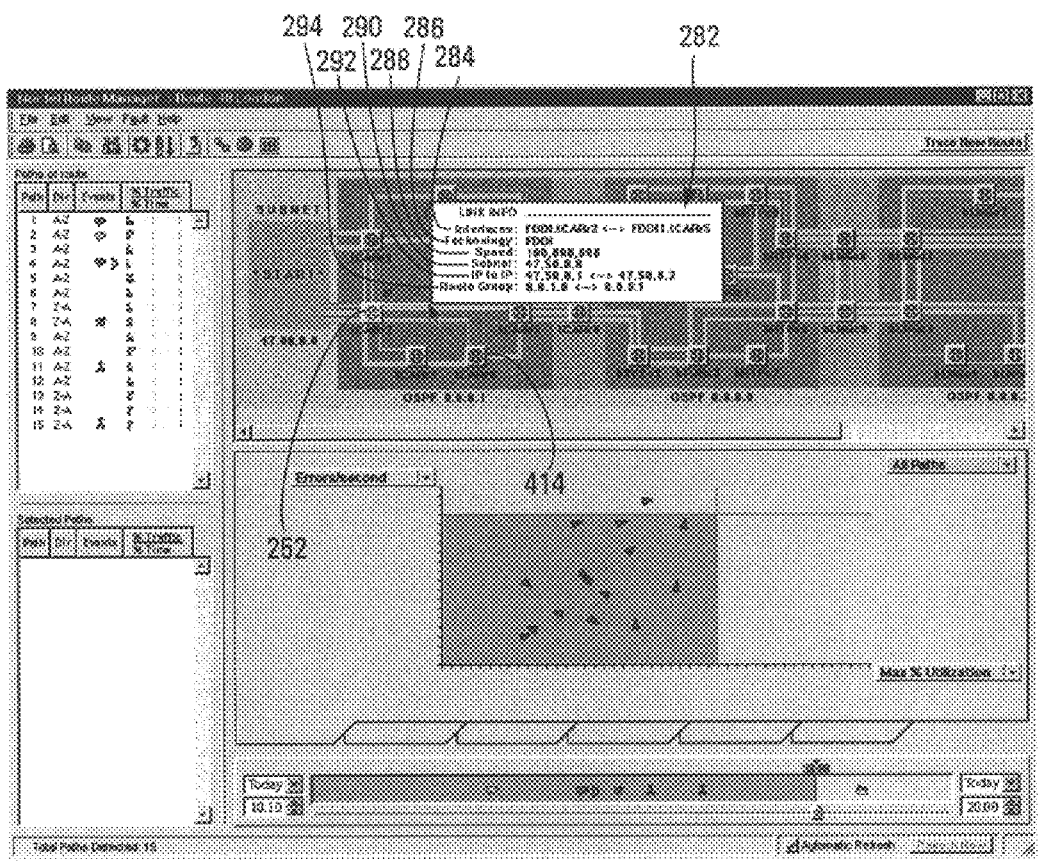
FIG. 5 is an illustration of the GUI of FIG. 3 showing link information for a selected link.

As shown in FIG. 5, when a particular link is selected, for example, by left-clicking on the mouse 23 used to control the GUI 24, a link information window 282 appears displaying information about the selected link, associated path or interface. In the preferred embodiment illustrated in FIGS. 3 through 25, the link information displayed includes identification 284 of the interfaces connected by the link; the type of technology or protocol used 286 in communicating across the link, FDDI (Fibre Distributed Data Interface), Ethernet, or ATM for example; the maximum speed 288 with which data is communicated across the link in bits per second; an identification 290 of the subnet within which the particular link resides; the IP addresses 292 of the two interfaces connected by the links; and the route groups or route sub-groups 294 connected by the link—if the link resides completely within one route group or route sub-group, then only one route group is shown.

Figure 8:
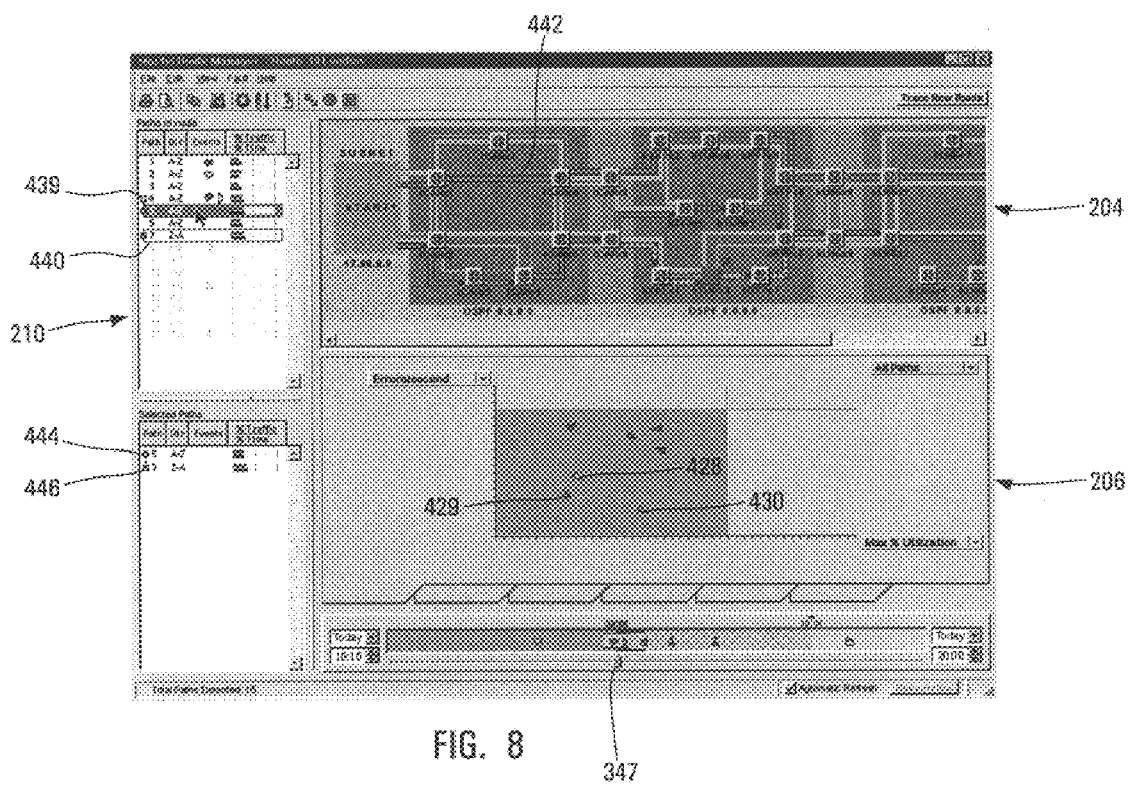
FIG. 8 is an illustration of the GUI of FIG. 6 with path 5 selected in a paths panel.
Figure 9:
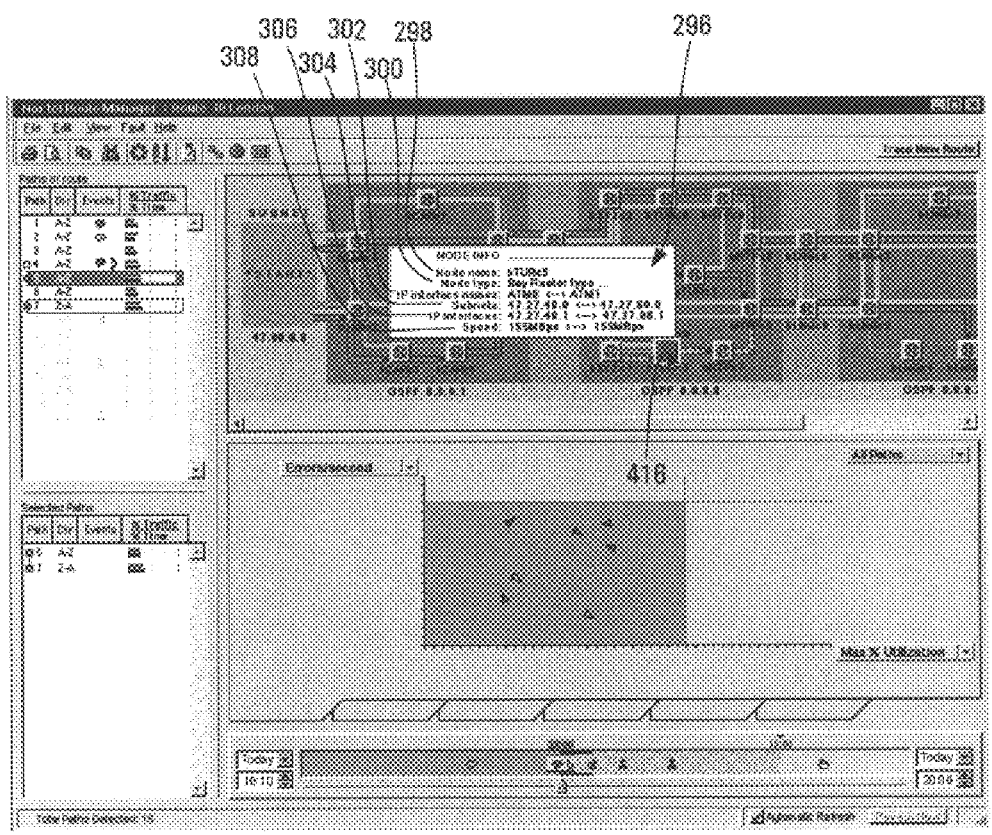
FIG. 9 is an illustration of the GUI of FIG. 8 showing node information for a selected node.

As shown in FIG. 9, when a particular node is selected, for example, by left-clicking on the mouse 23, a node information window 296 appears displaying information about the selected node. In the preferred embodiment illustrated in FIGS. 3 through 25, the node information displayed includes the node name 298, as assigned by the network administrator; the node type 300 typically identifying the manufacturer and model name for the device; identification 302 of the relevant interfaces of the node; the subnets 304 with which the node communicates on the path selected; the IP addresses 306 for the relevant interfaces of the node; and the maximum speeds 308 for data travel at these interfaces. Of course, any set of relevant information may be displayed in the node information window 296.

Performance Panel

Figure 16:
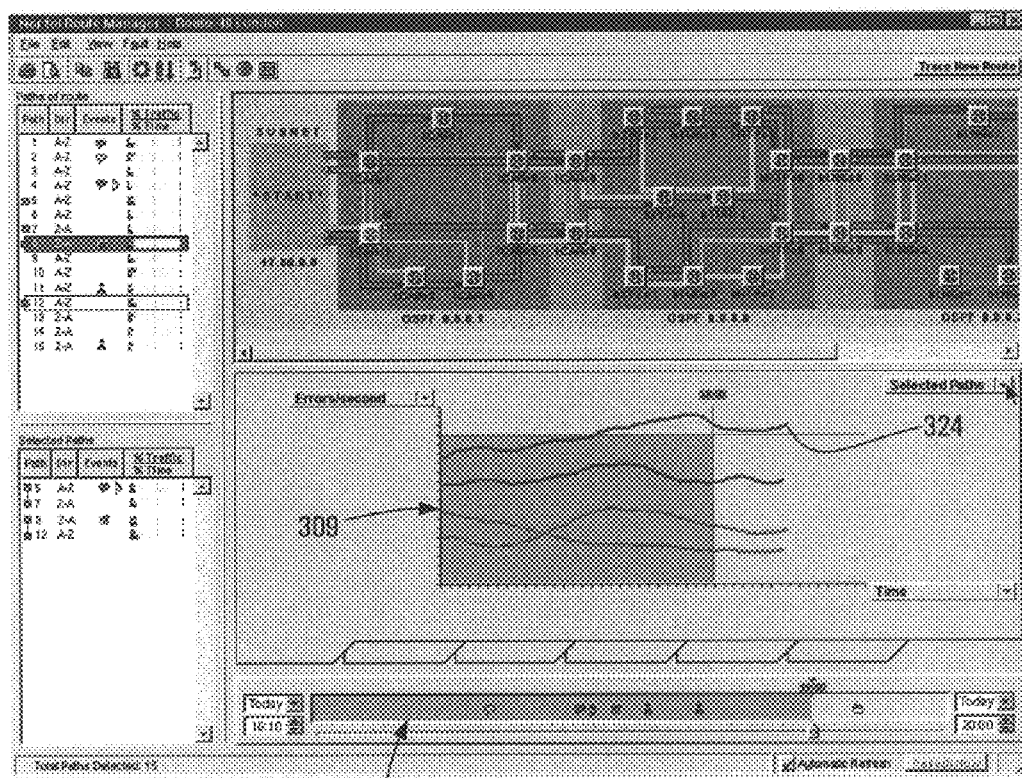
FIG. 16 is an illustration of the GUI of FIG. 15 with "Time" selected in the horizontal axis parameter indicator pull-down menu of the performance panel.

Returning to FIG. 3, the performance panel 206 displays performance data in a graphical format, and appears in the middle of the right side of the preferred embodiment GUI 24 of the present invention. The performance panel 206 displays an X-Y graph 309, including a horizontal axis 310 and a vertical axis 312, a horizontal axis parameter indicator 314, a vertical axis parameter indicator 316, a dataset indicator 318, and data indicia, which may appear as points, 322 for example, as shown in FIG. 3, or lines, 324 for example, as shown in FIG. 16.

Figure 14:
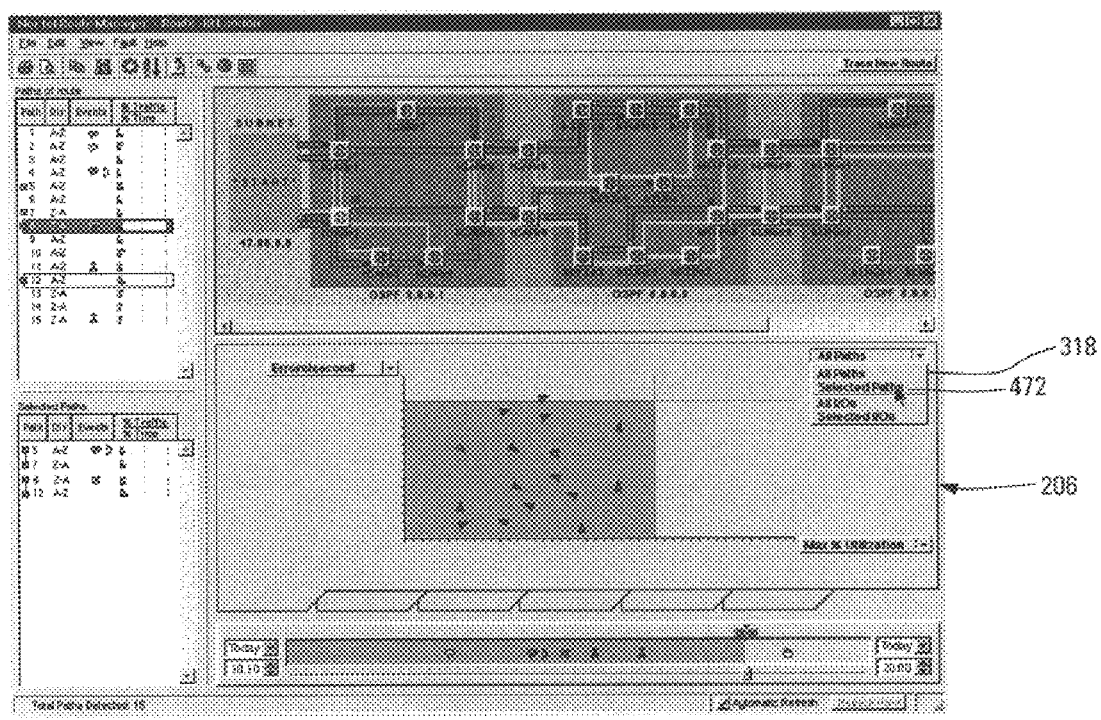
FIG. 14 is an illustration of the GUI of FIG. 13 with a dataset indicator pull-down menu displayed in a performance panel.

The data to be displayed is determined by the user. In this embodiment, the dataset parameter indicator 318 which has an associated pull-down menu as shown in FIG. 14 allows the user to select the dataset. As shown in FIG. 14, the possible sets of data to be displayed may, for example, be:

"All Paths"—all paths taken by data on the selected route;

"Selected Paths"—paths selected by the user, as further discussed below;

"All I/Os"—all input and output interfaces for each node along the selected path; or "Selected I/Os"—selected input and/or output interfaces for a selected node along the selected path.

When a particular set of data is selected, the selected dataset appears on the X-Y graph 309. Of course, the dataset may be selected through other means, using the menu bar 216 for example.

Figure 15:
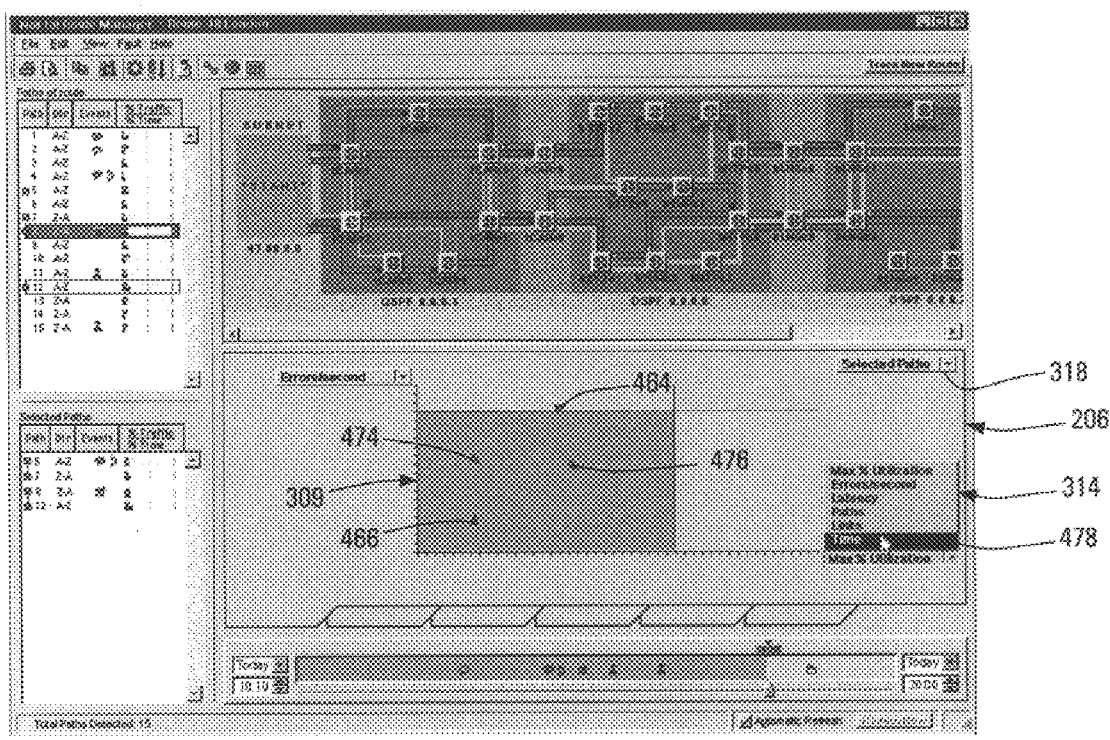
FIG. 15 is an illustration of the GUI of FIG. 14 with "Selected Paths" having been selected in the dataset indicator pull-down menu, and with a horizontal axis parameter indicator pull-down menu displayed in the performance panel.

Each of the horizontal axis parameter indicator 314 and the vertical axis parameter indicator 316 allow the user to select the information to be displayed on the X-Y graph 309 through associated pull-down menus as shown in FIG. 15 with respect to the horizontal axis parameter indicator. The choices for each of the horizontal axis parameter indicator 314 and the vertical axis parameter indicator 316 may, for example, be:

"Max % Utilization"—the actual traffic traveling across a given interface or path as the case may be, as a percentage of the maximum amount of traffic which may travel across that interface or path;

"Errors/second"—the number of errors detected at a given interface, or across a given path as the case may be, per second;

"Latency"—the deviation in the time required for a data packet to travel across a given interface or path;

"Paths"—usage for each path;

"Links"—usage for each logical link; and

"Time"—data over the time selected in the timebar 346, as further discussed below.

Other parameters may, of course, be used. Again, when a particular selection is made in either the horizontal axis parameter indicator 314 or the vertical axis parameter indicator 316, the data displayed on the X-Y graph 309 changes accordingly. Of course, each of the horizontal and vertical axis parameters may be pre-set, or may be set through other means—using the menu bar 216 for example.

Figure 19:
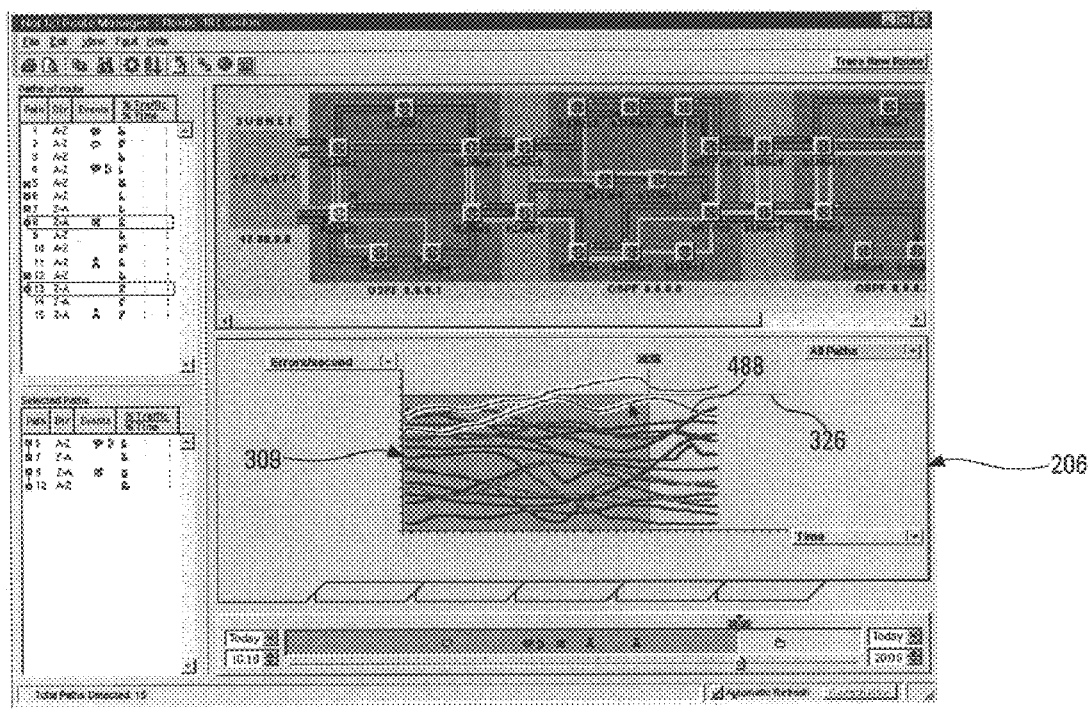
FIG. 19 is an illustration of the GUI of FIG. 18 with the second-from-the-top data line additionally selected in the performance panel.
Figure 20:
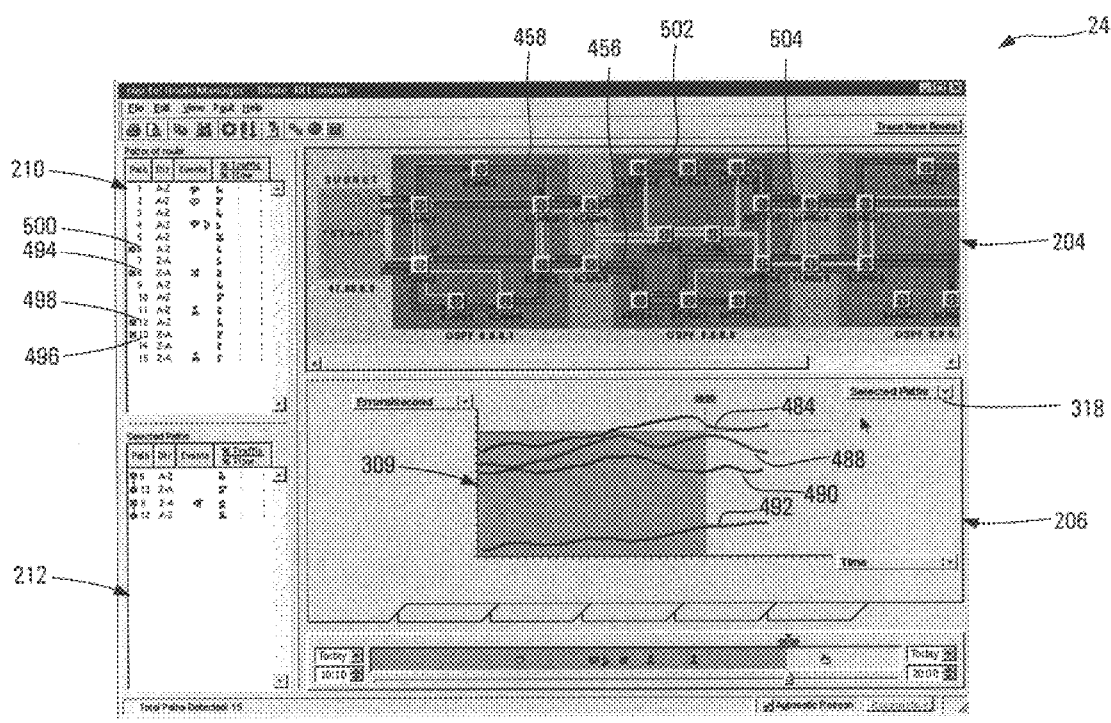
FIG. 20 is an illustration of the GUI of FIG. 19 with "Selected Paths" having been selected in the dataset indicator pull-down menu.

As shown in FIGS. 19 and 20, selecting "Selected paths" for the dataset indicator 318 limits the data displayed on the X-Y graph 309 to those data indicia selected by the user, and their corresponding return paths, where applicable.

In the preferred embodiment, when the data to be displayed on the X-Y graph 309 consist of points, as in FIG. 3, each data point, 322 for example, preferably is displayed so as to indicate direction, for example with an elongated isosceles triangle. The direction in which the elongated end of the isosceles triangle is pointed corresponds with the direction in which the data point is moving at that time.

The X-Y graph 309 may also display threshold lines 326 and 328 as shown in FIG. 3. These threshold lines 326 and 328 represent values above or below which it is undesirable for the data displayed on the X-Y graph 309 to travel. These threshold values are set by the user, through the menu bar 216, tool bar 218, or other means. The area 330 of the X-Y graph bound by these threshold lines 326 and 328 may be darkened, as shown in. FIG. 3.

Figure 21:
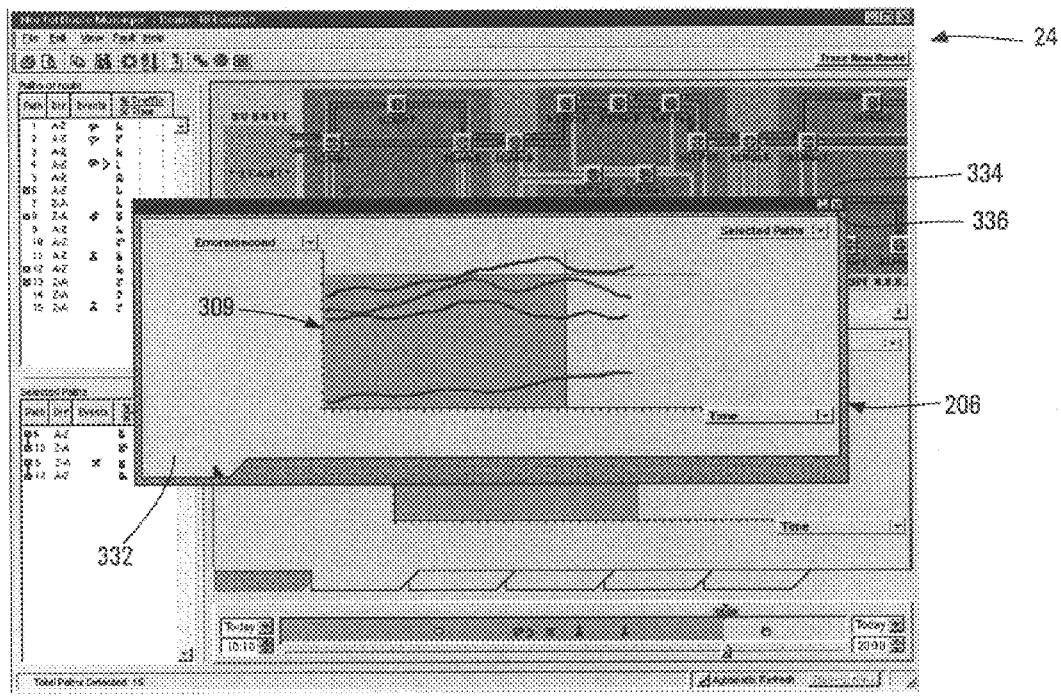
FIG. 21 is an illustration of the GUI of FIG. 20 with a selected window of the performance panel dragged to the centre of the GUI.

The preferred embodiment of the GUI 24 of the present invention permits the user to manipulate and view several, and preferably six performance panels 206 at the same time. As shown in FIG. 21, each of these performance panels 206 may be moved about by clicking on the tab 332 at the bottom of the graph and dragging the panel to the desired location. The performance panel 206 may also be minimized or closed by, for example, clicking on minimization 334 and close 336 icons at the top right corner of the performance panel 206.

In the preferred embodiment GUI 24, the data indicia may be graphically displayed as either points, lines, or bars (not shown). An example of a bar graph would be if "paths" were selected in the vertical axis parameter indicator 316, and "time" were selected horizontal axis parameter indicator 314, in which case an intermittent horizontal bar graph would be displayed showing the times during which traffic traveled in each path. Although the performance panel 206 has been described as displaying performance characteristics graphically, these characteristics may also be displayed in a tabular format.

Time Panel

Returning to FIG. 3, the time panel 208 appears at the bottom of the right side of the preferred embodiment GUI 24 of the present invention, and consists of the start date selector 338, start time selector 340, end date selector 342, end time selector 344, timebar 346, time slide-tab 347 and time indicator 348. The purpose of the time panel 208 is to display and allow an operator to control the time period for which performance data is displayed in the GUI 24, and to show network events which occurred in that time period.

The start time and date (sometimes referred herein as start time/date) are selected by the user by means of the start date selector 338 which may, for example be a pull-down menu, and the start time selector 340. The start time may be selected by typing the time directly into the start time selector 340 window, or by moving the time forward or backward using the up and down arrows 350 associated with the start time selector. The end time and date (sometimes referred herein as end time/date) may be selected by the user in a similar fashion using the end date selector 342 and the end time selector 344.

The selected time for which any instantaneous data appears in the GUI 24 is indicated by the time indicator 348. The time slide-tab 347 may be moved along the timebar 346 by clicking on the time slide-tab and dragging it to the right or left. The indicator dicator 348 moves along with the time slide-tab 347 indicating the selected time.

The timebar 346 also displays event icons corresponding to nework events which have occurred on the selected route during the selected time period. Different icons are displayed for different network events. The icons used in the GUI 24 of the present invention are preferably of an established set, such that the user of the display will quickly identify the event associated with the icon. An example of such a set of network event icons is disclosed in U.S. patent application Ser. No. 08/764,086 filed Dec. 6, 1996 by Miguel Planas, et al., now U.S. Pat. 6,112,115 issued Aug. 29, 2000, and assigned to the assignee of the present application, hereby incorporated by reference in its entirety. In the preferred embodiment illustrated in FIGS. 3 through 25, the icons used are indicated in FIG. 3:

| REFERENCE NUMBER | EVENT |
| --- | --- |
| 408 | critical/major alarm |
| 358 | warning alarm |
| 360 | path re-route |
| 362 | threshold crossing |

-continued

| REFERENCE NUMBER | EVENT |
|---|---|
| 364 | software download |
| 366 | scheduled maintenance |

A critical/major alarm icon 408 indicates an error requiring immediate attention, while a warning alarm icon 358 simply indicates that an abnormal event has occurred and should be investigated. A path re-route icon 360 indicates where a node was unsuccessful in communicating data across the intended path, and the data was therefore required to be re-routed to another path. A threshold crossing icon 362 represents an event in which some performance characteristic exceeded a threshold value set by the user. A software download icon 364 indicates the downloading of software from the NMD 18 for example to a particular node, for upgrading of internal software for example, and finally, a scheduled maintenance icon 366 indicates the time at which maintenance is scheduled for a particular node. Of course, any other set of network event icons may be used. The location of the event icon along the timebar 346 preferably indicates the time at which the event was first detected.

Figure 6:
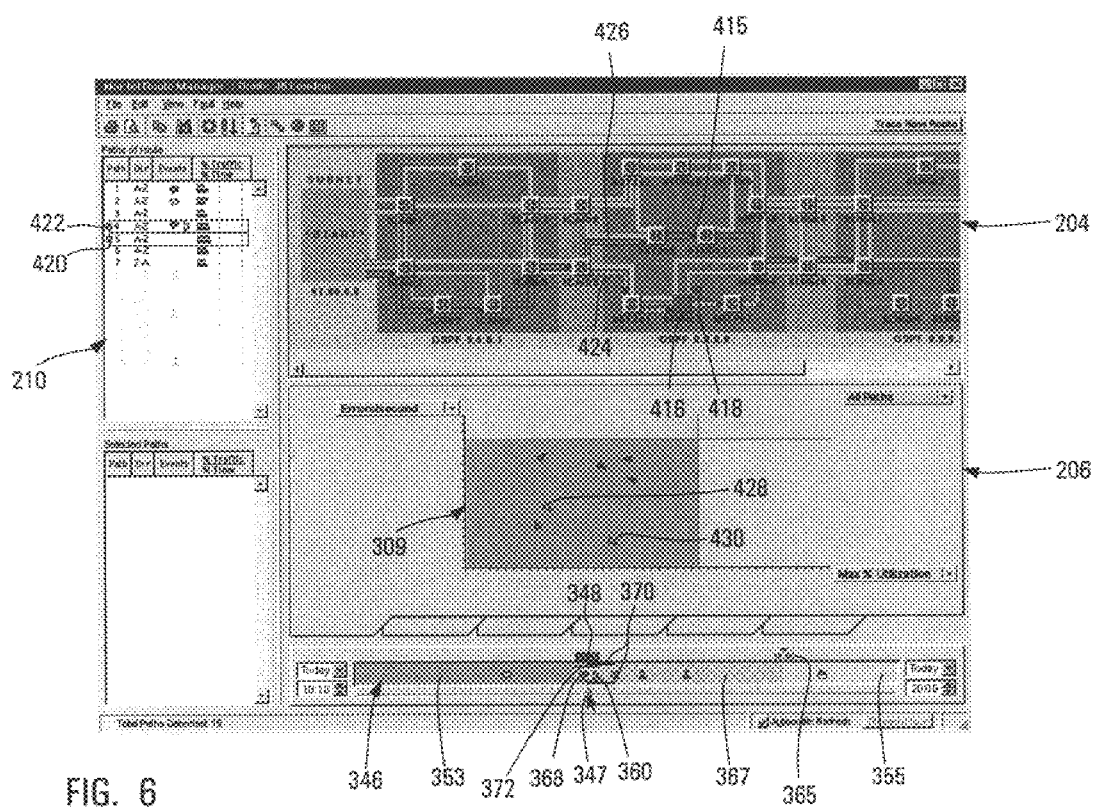
FIG. 6 is an illustration of the GUI of FIG. 3 with a time of 14:20 selected on a timebar.

As shown in FIG. 6, when the time slide-tab 347 is dragged to a particular location along the timebar 346, the time indicator 348 moves along with it, displaying the selected time. The current time is indicated by a current time indicator 365 comprising a time display below a small triangle. Preferably, the current time is substantially equal to an actual network time. There is no current time indicator 55 if only historical data is to be viewed, i.e. if the end time/date has already occurred. Preferably, the portion 353 of the timebar 346 representing the period between the start time/date and the selected time appears in a dark shading. The portion 367 of the timebar 346 representing the period between the selected time and the current time appears in a lighter shading, and the portion 355 of the time bar representing the period between the current time and the end time/date appears in white.

If the selected time coincides with the time at which a network event was first detected, the associated event icon or icons is/are highlighted. In the example shown in FIG. 6, two associated network events, a critical/major alarm 368 and a path re-route 360, occurred at the selected time, 14:20 and thus, both events include are highlighted 372. Additionally, if the event is not an instantaneous event, the duration of the event is indicated by heavier lines 370 extending along the timebar 346.

Figure 11:
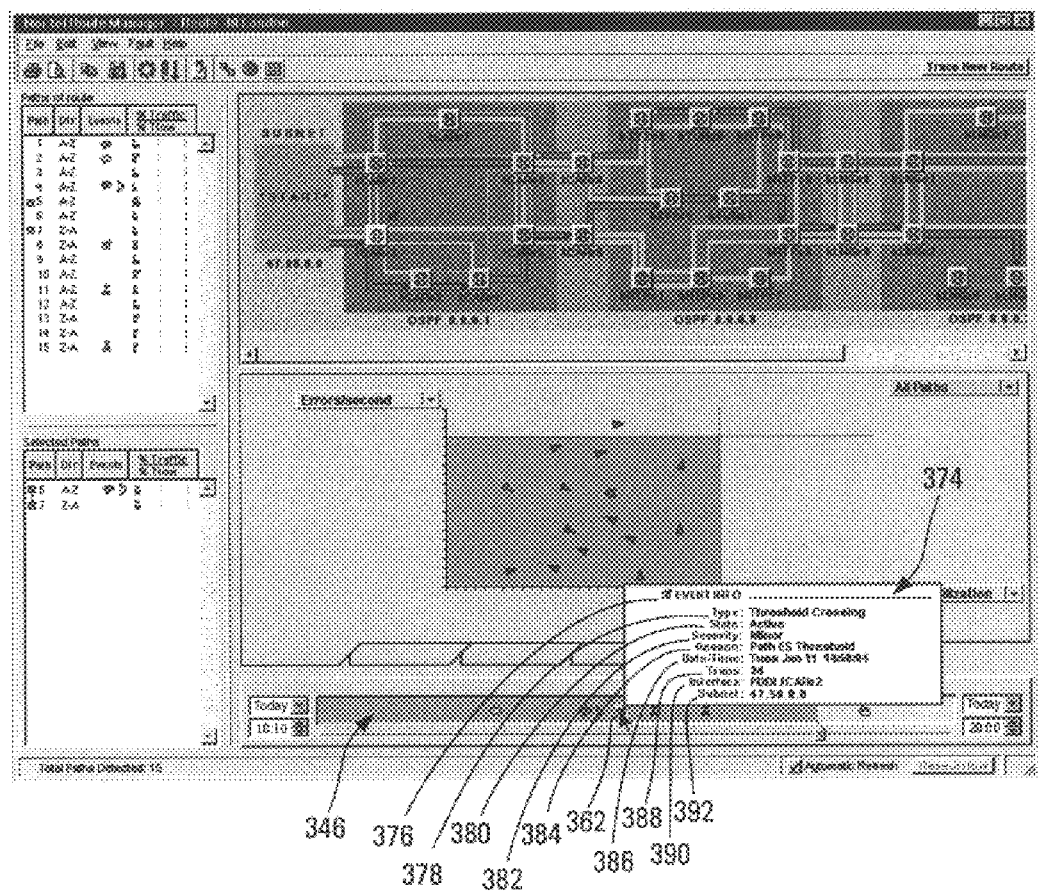
FIG. 11 is an illustration of the GUI of FIG. 10 showing network event information for a selected network event.

As shown in FIG. 11, if the user selects an event on the timebar 346, for example by left-clicking on the mouse 23, an event information window 374 appears. In the preferred embodiment, this event information window 374 displays an icon 376 representing the type of event selected; a description 378 of the type of event selected; an indication 380 of whether the event is still active at the selected time; the severity 382 of the event; the cause 384 of the event; the date and time 366 at which the event was first detected; the number of times 388 notice of the event was sent to the NMD 10 by an event sensor or "trap" in the affected node; the location 390 at which the event occurred, in this case the interface at which the threshold crossing occurred; and the subnet 392 affected by the event. Of course, any other relevant information may be displayed.

Figure 12:
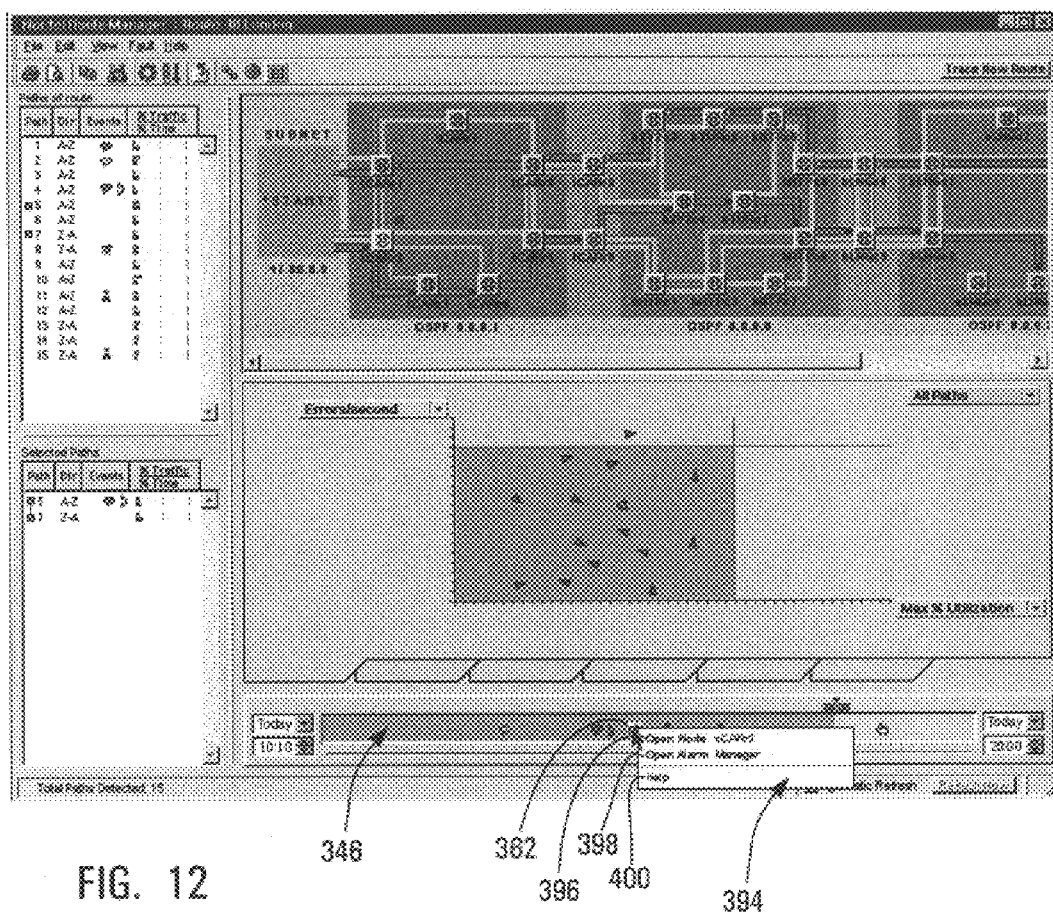
FIG. 12 is an illustration of the GUI of FIG. 10 showing network event options for a selected network event.

As seen in FIG. 12, if the user selects an event in another manner, for example by right-clicking on the mouse 23, an event options menu 394 appears. In the preferred embodiment, the event options for a threshold crossing are Open Node 396, allowing the user to view the cards and slots of the node at which the threshold crossing occurred to allow the user to easily identify the cause of the problem; Open Alarm Manager 398 which opens a separate application to permit the user to perform further diagnostics in connection with the event; and Help 400, to display help text relating to the selected event.

In the preferred embodiment GUI 24, as the user drags the time slide-tab 347 along the timebar 346, each of the time panel 208, route panel 204, performance panel 206 and paths panel 210 are continuously updated. If the user selects the GUI 24 to update itself in real time for the current conditions, for example through selection of such a feature in the menu bar 216, all information displayed in the GUI 24 is automatically updated as new information is received. Finally, in a feature not demonstrated in the figures, by selecting animation of the GUI, for example in the menu bar 216, and by selecting a first time and a second time, the information displayed in the GUI is animated to show continuous information between the first time and the second time.

Paths Panel

Returning once again to FIG. 3, the paths panel 210 appears in the upper half of the left side of the preferred embodiment GUI 24 of the present invention. The paths panel 210 displays information relating to each path along which data has traveled between the start and end points of the selected route during the time period selected on the timebar 346. In the preferred embodiment, in connection with each such path, the paths panel displays the path number 402, assigned in the order in which a data path is detected for the time period selected on the timebar 346; the direction 404 of data travel on the path, "A–Z" representing a path direction from the start to the end, "Z–A" representing the reverse direction; event icons 406, as described above, representing any events which have occurred on a given path; and horizontal bar graph indicators 408 showing the percentage of total traffic between the start and end points of the selected route traveling along a given path, and the percentage of the total time during which data is traveling between the start and end points of the selected route, that data is traveling along a given path. Of course, the paths panel 210 may display other information about each path, such as the average time taken for data to travel across the path, or may omit some or all of the data described above.

Also, in the preferred embodiment of the present invention, those paths on which data first traveled between the start time/date and the selected time appear in solid, while those paths on which data first traveled between the selected time and the current time appear in ghost. Those paths on which data has not traveled between the start time/date and the current time do not appear in the paths panel 210 since they do not yet exist.

Selected-paths Panel

The selected-paths panel 212 is located in the lower half of the left side of the preferred embodiment GUI 24 of the present invention. The selected-paths panel 212 displays the same information as the paths panel 210, except only for those paths which have been selected by the user, as further discussed below.

INTERACTION OF THE PANELS

The interaction of the panels in the preferred embodiment GUI 24 illustrated in FIGS. 3 through 25 will now be discussed. Of course, it is to be understood that the various panels of the GUI 24 may interact in other ways, and the following is provided by way of example only.

If the selected time on the timebar 346 coincides with the time at which a network event is first detected, the path affected by the network event is visually distinguished in the paths panel 210 using a distinguishing characteristic, a different colour, and/or by displaying a box around the path, for example. Also, the graphical representations of the links comprising the path affected by the network event is visually distinguished in the route panel 204 using the same, or similar distinguishing characteristic, the same colour, for example. Further, any data indicia in the performance panel 206 corresponding with the affected path is also visually distinguished using the same or similar distinguishing characteristic, the same colour, for example.

If a path is selected in the paths panel 210, the selected path, as well as any corresponding return paths are visually distinguished using a distinguishing characteristic in the paths panel, a different colour for example. Information regarding the selected path and any corresponding return paths also appear in the selected-paths panel 212. Further, the graphical representations of the links comprising the selected path and any corresponding return paths are also visually distinguished in the route panel 204 using the same or similar distinguishing characteristic. Finally, any data indicia in the performance panel 206 corresponding with the selected path and any corresponding return paths are also visually distinguished using the same or similar distinguishing characteristic, the same colour, for example.

If data indicia are selected in the performance panel 206, the selected data indicia are visually distinguished using a distinguishing characteristic, a different colour, for example, and upon subsequently changing the dataset displayed in the dataset indicator to one which shows only the selected data, any data indicia not selected disappears. Further, any paths associated with the selected data indicia are visually distinguished in the paths panel 210 using the same or similar distinguishing characteristic, and graphical representations of any portion of the route represented by the selected data indicia are also visually distinguished in the route panel 204 using the same or similar distinguishing characteristic. Finally, information regarding any paths associated with the selected data indicia are displayed in the selected-paths panel 212.

FUNCTIONALITY BEHIND THE GUI

Having described the appearance and panel interaction of a preferred embodiment of the GUI of the present invention, a particular example of functionality behind the operation of this preferred embodiment GUI will now be described with reference to the flowcharts shown in FIGS. 26 to 30. More generally, any functionality which is capable of transforming a database of network connectivity and performance information into displays such as exemplified herein may be employed.

Figure 26:
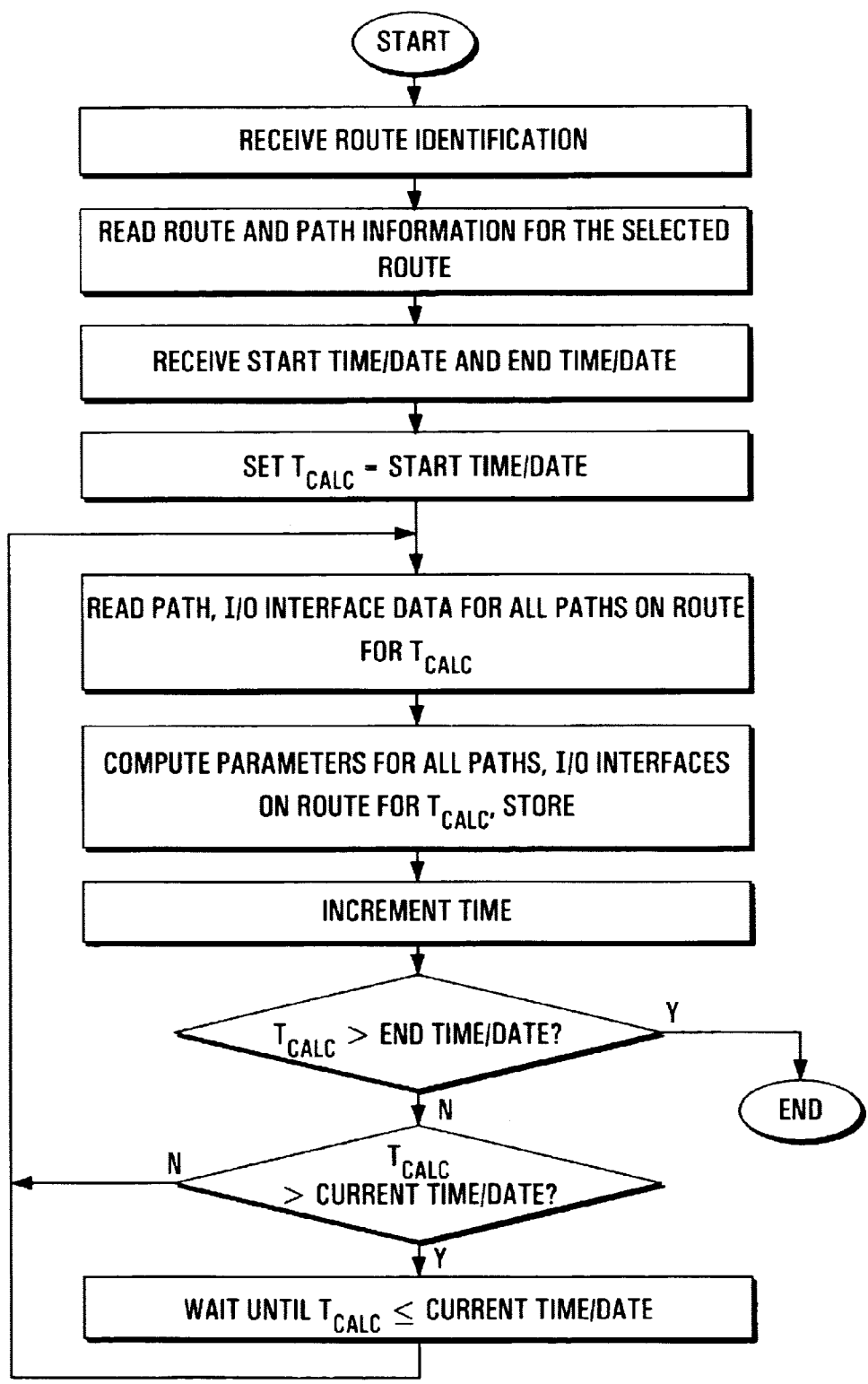
FIG. 26 is a flowchart for the calculation of information to be displayed in the preferred embodiment GUI of FIG. 3.

Referring first to FIG. 26, this flowchart shows how the local database 29 of information used by the GUI 24 is developed, and maintained. The process is run continuously so long as there is not a complete set of data for display for the time period selected in the time panel 208. To begin, before any processing is done, a user defines a route by selecting a start point and an end point. This may be done by selecting the Trace New Route button 220, for example, or the route may be selected by a separate application, for example as disclosed in concurrent U.S. application Ser. No. 09/345,472 to Rochford et. al., now U.S. Pat. No. 6,487,604 issued Nov. 26, 2002, assigned to the same assignee as the present application, entitled "Route Monitoring Graphical User Interface, System and Method", which opens the GUI 24 of the present invention for a particular route. Route and path information for the selected route is then read from the database 12. Such information may include identification of the start and end points of the route, identification of any route groups, identification of the nodes and links on the selected route, the course and direction of each path on the route, maximum speed of communication at each I/O interface, etc. The user also enters a start time/date and an end time/date.

Next, the time of calculation, $T_{CALC}$ is set to equal the start time/date. Now path and I/O interface information, including any network events, is read from the database 12 for all paths and I/O interfaces on the selected route. For each path and I/O interface of the selected route, various parameters are computed as described below, and stored in the local database 29. Next, the time $T_{CALC}$ is incremented. If $T_{CALC}$ is greater than the end time/date, then the calculation is finished. Furthermore, if the time $T_{CALC}$ is greater than the current time then there would be no further information to process at this point, and the system will wait until the time $T_{CALC}$ is less than the current time, at which point there would be further information to process.

Thus the flowchart of FIG. 26 covers two situations. First, the start and end time/dates may both be in the past in which case all of the information needed to compute parameters for all of the times of interest is already available, and as such no waiting needs to be done, but rather a complete local database can be created for the selected time period. Alternatively, if the current time is earlier than the end time/date then the parameter points can only be computed from the start time/date up until the current time. Then the database is maintained in real-time to include all of the most current data. Of course, rather than computing the contents of the local database 29 a priori, the necessary information can be computed directly from the database 12 every time the selected time changes.

Figure 27:
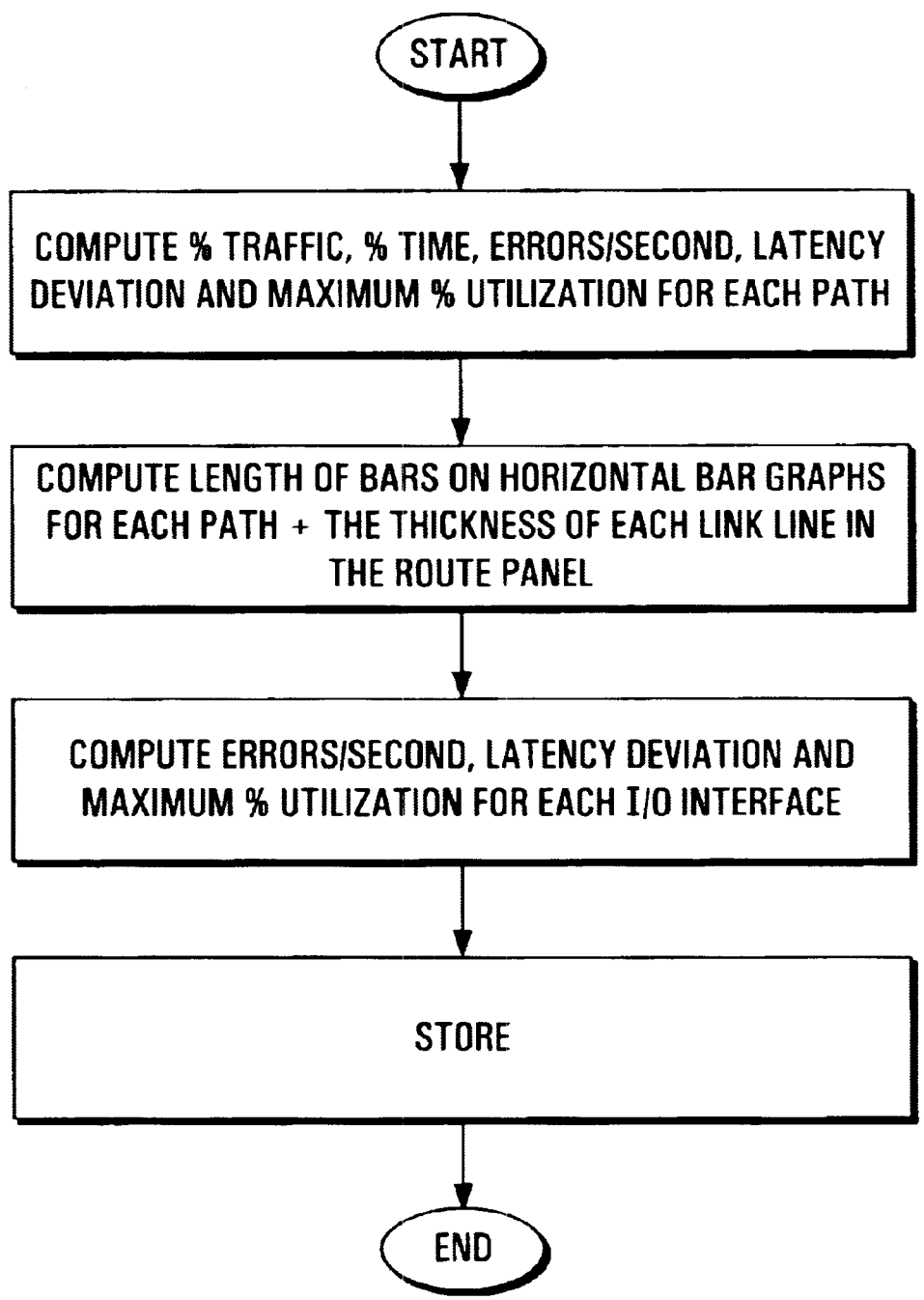
FIG. 27 is a flowchart for how parameters for a given point in time are calculated for display using the GUI of FIG. 3.

Referring now to FIG. 27, the steps taken to compute the parameters will be described. Firstly, the parameters errors/second, latency and maximum % utilization are computed for each path on the selected route for $T_{CALC}$. Next, % traffic and % time are calculated for $T_{CALC}$, and the length of each horizontal line in the horizontal bar graphs 408 in the paths panel 210, as well as the thickness of the link lines in the route panel 204 are calculated for $T_{CALC}$. Next, the parameters errors/second, latency and maximum % utilization are computed for each I/O interface on the selected route for $T_{CALC}$. These parameters are then stored in the local database 29. Of course, if other axis parameters are to be made available for display, these too must be calculated in addition to, or instead of the above-mentioned parameters.

Figure 28:
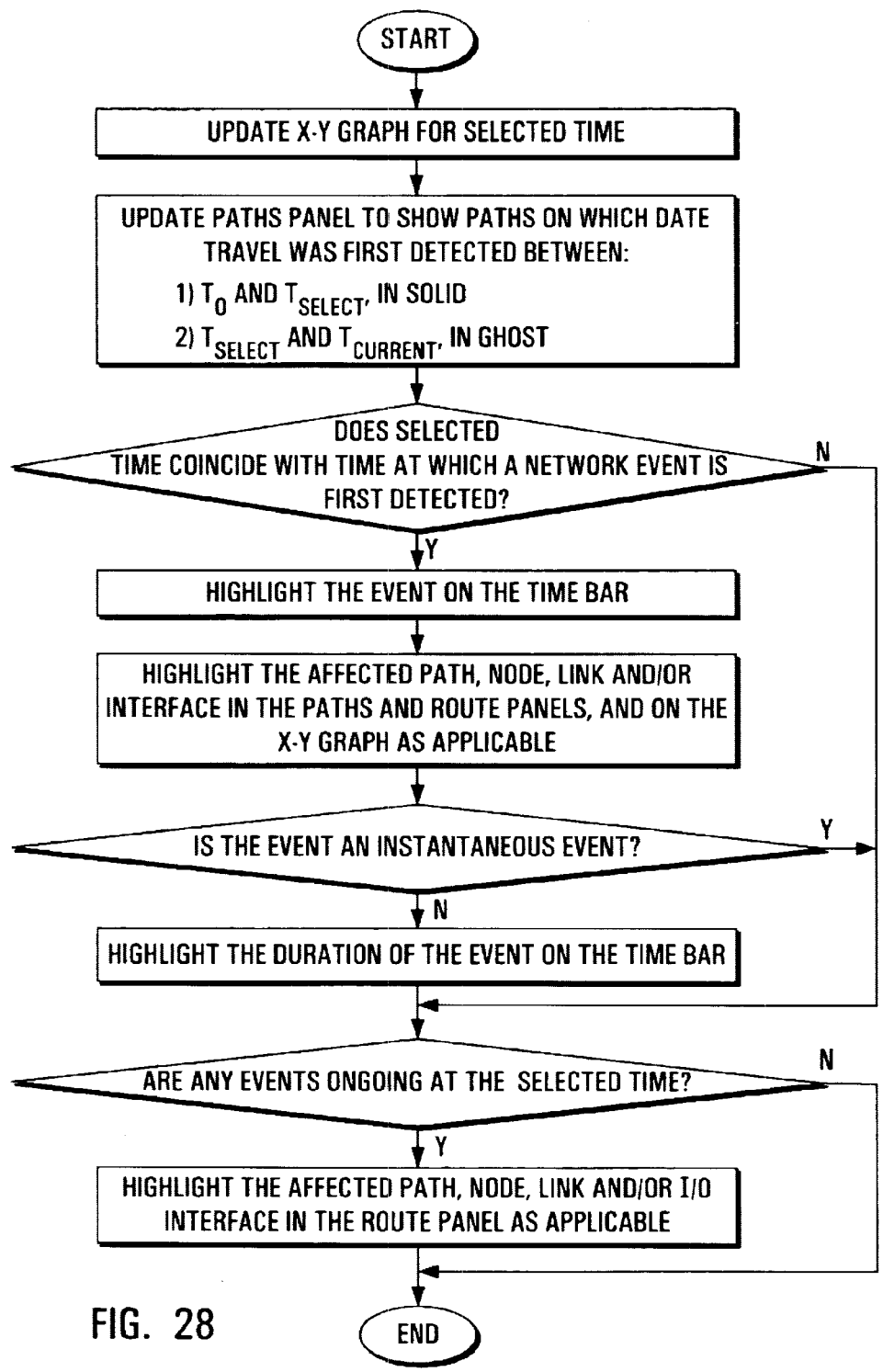
FIG. 28 is a flowchart for how the GUI of FIG. 3 is updated when a new time is selected.

FIG. 28 is a flowchart showing the steps taken upon selection by the user of a new selected time on the timebar 346, as shown graphically in FIG. 6. First, as discussed in greater detail below, the X-Y graph 309 in the performance panel 206 is updated to show data for the selected time. Next, the paths panel 210 is updated so as to display 1) those paths on which data travelled between the start time/date ($T_O$) and the selected time ($T_{select}$), in solid, and 2) those paths on which data travel was first detected between the selected time ($T_{select}$) and the current time ($T_{current}$) in ghost. If the selected time coincides with the time at which a network event is first detected, the event icon coinciding with the event is highlighted on the timebar 346, the affected path, node, link and/or I/O interface, as applicable, in the paths panel 210, the route panel 204 and the X-Y graph 309 are highlighted, and if the event is not an instantaneous event, the duration of the event is also highlighted on the timebar 346. Finally, if any other events are ongoing at the selected time, the affected path, node, link and/or I/O interface, as applicable, is highlighted in the route panel.

Figure 29:
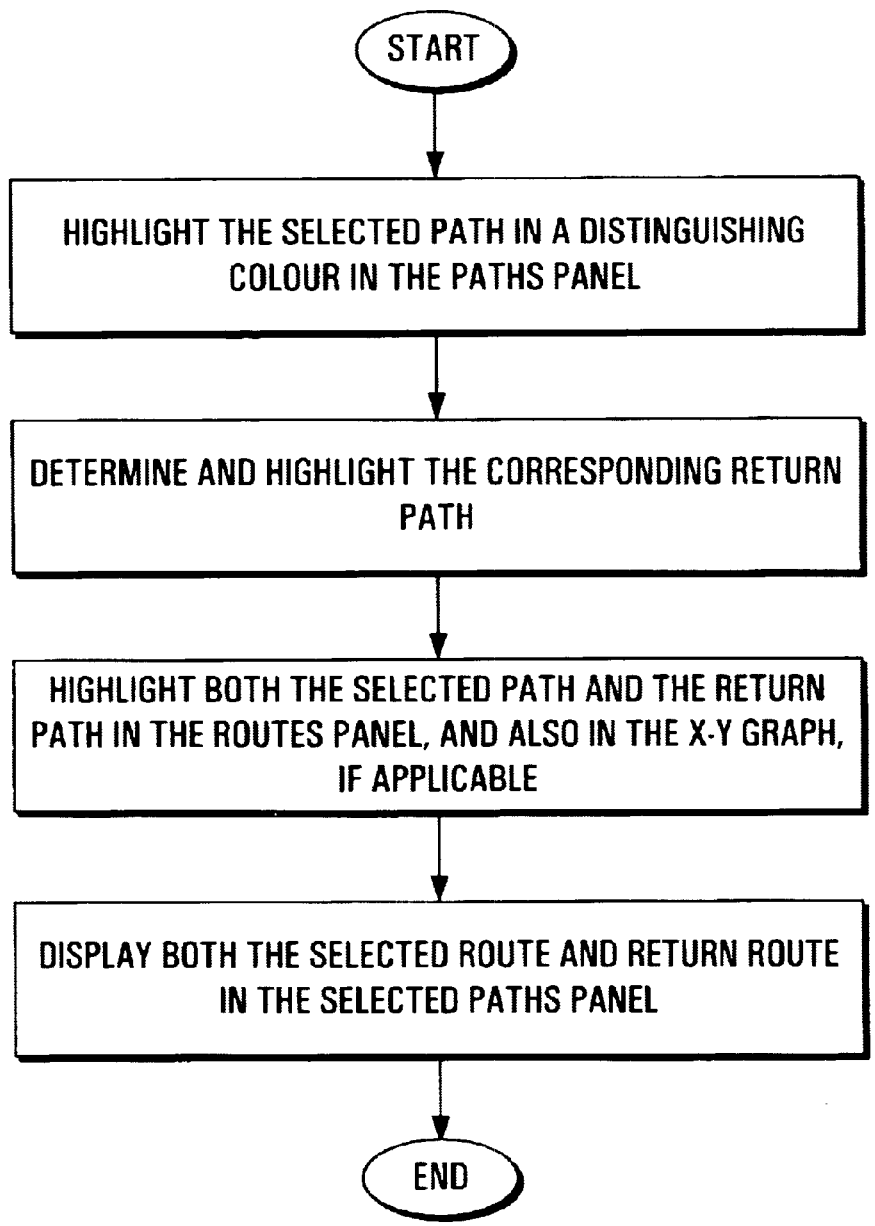
FIG. 29 is a flowchart for how the GUI of FIG. 3 changes when a path is selected in the paths panel.

Turning to FIG. 29, this flowchart shows the steps taken upon selection of a path in the paths panel 210 as graphically shown in FIG. 8. First, the selected path is highlighted in a distinguishing colour in the paths panel 210. Next, any corresponding return paths are identified, and highlighted in the paths panel 210. The corresponding return paths are those paths on which data travelled in the opposite direction on the route for the time periods during which data travelled on the selected path. Both the selected path and the return paths are then highlighted in the route panel 204 in the same distinguishing colour. Any data indicia on the X-Y graph 309 corresponding to either the selected path or return paths are likewise highlighted in the same distinguishing colour in the performance panel 206. Finally, both the selected path and return paths are displayed in the selected paths panel. Optionally, (not illustrated), the times during which data has travelled on the selected path may be highlighted on the timebar 346.

Figure 30:
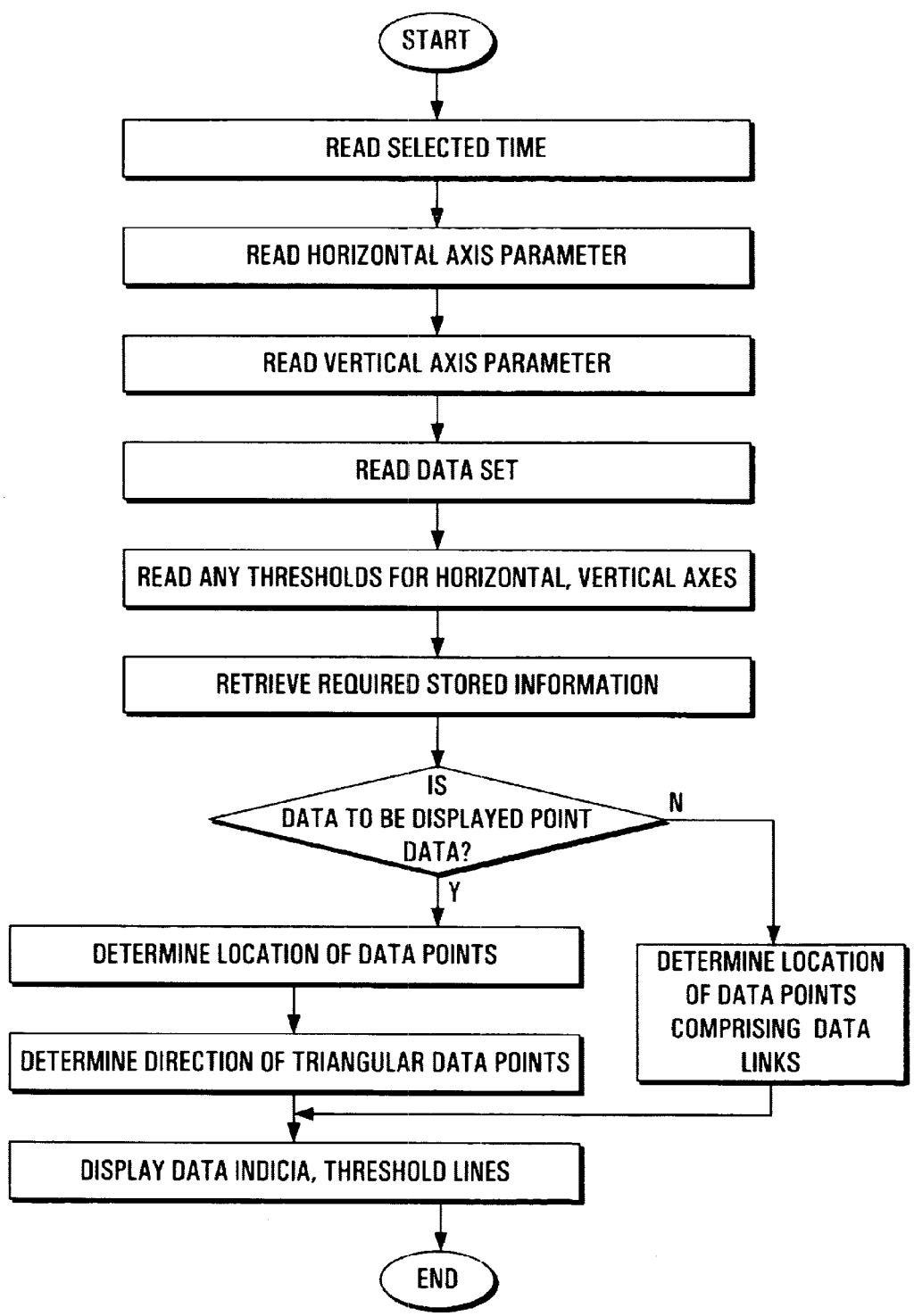
FIG. 30 is a flowchart for how an X-Y graph displayed in the performance panel of the GUI of FIG. 3 changes when a new time, horizontal axis parameter, vertical axis parameter or dataset are selected.

Displaying and updating of the X-Y graph 309 in the performance panel 206 will now be described with reference to the flowchart shown in FIG. 30. The steps described in this flowchart will be followed whenever a new selected time is selected on the timebar 346, a new horizontal axis parameter is selected on the horizontal axis parameter indicator 316, a new vertical axis parameter is selected on the vertical axis parameter indicator 314, or a new dataset is selected on the dataset indicator 318. First, each of the selected time, horizontal axis parameter, vertical axis parameter and dataset are read from the GUI 24. Next, any thresholds for the horizontal or vertical axis defined by the user are read. The relevant data is then retrieved from the local database 29. If the data indicia are to be displayed as point data, the location and direction of the isosceles triangles to be displayed are calculated. If the data indicia are to appear as lines, the location of the points comprising the lines are calculated. Finally, the thresholds, and the data indicia are displayed on the X-Y graph 309.

Figure 18:
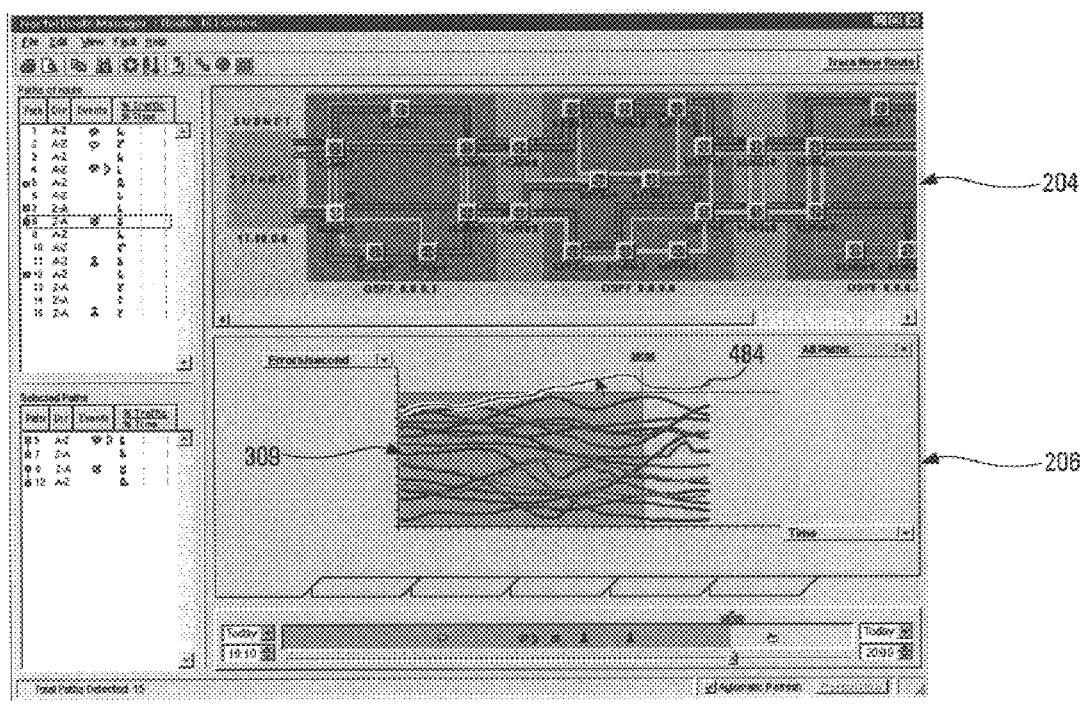
FIG. 18 is an illustration of the GUI of FIG. 17 with the top-most data line selected in the performance panel.

Selection of certain paths on the X-Y graph 309 is shown graphically in FIGS. 18, 19 and 20, and is effected by selecting the paths themselves, and then selecting Selected Paths from the dataset indicator 318. The steps taken by the GUI 24 in response to such selection is substantially the same as for He selection of paths in the paths panel as depicted in the flowchart of FIG. 29, and as discussed above. Optionally, an information box may be displayed in response to selection of paths on the X-Y graph 309, containing information about the selected path(s).

The above described example has focussed on a situation in which device-level status and performance information has been collected from a network, for example using the method taught by the above identified Robinson et al reference. It is to be understood that other suitable network management interface devices may be employed to this end. The device-level status and performance information is transformed into path and route information by the method taught by Robinson et al. although other methods of doing this may alternatively be used. What is important is that the information collected from the network be transformed into information respecting each of a series of routes of interest. It is to be understood that the steps of collecting device-level status and performance information from the network and transforming the device-level status and performance information in path and route information may be implemented as part of an embodiment of this invention.

THE DEMONSTRATION

The operation of the preferred embodiment GUI 24 of the present invention and the interaction of the various panels will now be described with reference to an exemplary "demonstration" of the GUI illustrated in FIGS. 3 through 25.

FIG. 3 illustrates the preferred embodiment GUI 24 where the selected route has a user-defined name "Route 48 London", which has a start point 222 which is a subnet 226 with an IP address 228 of 47.80.0.0 228, and an end point 224 which is a subnet 226 with an IP address 230 of 47.66.0.0 (as shown in FIG. 4). Between the start point 222 and the end point 224 for the route are a number of interconnected nodes, 232, 242 and 252 for example, providing a number of paths over which data has traveled between the start point and the end point. In the illustrated route, the nodes are grouped into three route groups, 258, 260 and 262 identified as OSPF 0.0.0.1 264, OSPF 0.0.0.0 266 and OSPF 0.0.0.2 268 respectively. The start point 222 is connected to the first route group 258 identified as OSPF 0.0.0.1 through two access points 242 and 244, while the third route group 262, OSPF 0.0.0.2 268 is connected to the end point 224 through two access points 246 and 248 as well. The three route groups 258, 260 and 262 are connected to each other through two pairs of edge nodes, 270 and 272, and 274 and 276 respectively.

As shown on the start date selector 338, start time selector 340, end date selector 342 and end time selector 344 in the time panel 208, the selected time period for which data is to be displayed on the GUI 24 is between 10:10 and 20:00 of the day on which the GUI 24 is viewed. The time indicator 348 indicates that the current time is 18:00, and the time slide-tab 347 indicates that the time for which any instantaneous data is shown in the GUI 24 is also 18:00.

As shown in the paths panel 210, in the selected time period, data has traveled on the selected route along 15 paths, paths 1 through 6 and 9 through 12 being paths for data traveling from the start point 222 to the end point 224, and paths 7, 8 and 13 through 15 being paths for data traveling in the opposite direction, as indicated in the direction column 404. As shown under the events column 406, certain events have occurred in the time period selected in connection with certain of these paths, these events being a critical/major alarm on path 1, a warning alarm on path 2, a critical/major alarm and path re-route on path 4, a threshold crossing on path 8, and software downloads on each of paths 11 and 15. Additionally, the %traffic/%time column 408 displays the percentage of total traffic on the route traveling along each path, and the percentage of total time during which route traffic was traveling on the path.

The timebar 346 indicates that a warning alarm 358 was detected early on, a critical/major alarm 408, a path re-route 360 and a threshold crossing 362 were detected in rapid succession around the middle of the selected time period, followed by two software downloads 364 and 410. Where a future event has been scheduled, an icon representing the future event appears on the timebar 346 between the selected time and the end time/date. In this case, a scheduled maintenance icon 366 appears, indicating that maintenance is scheduled some time between 18:00 and 20:00.

The performance panel 206 shows an X-Y graph 309 displaying errors/second as a function of maximum % utilization, as indicated in the vertical axis parameter indicator 316 and the horizontal axis parameter indicator 314, for all 15 paths, as indicated in the dataset indicator 318. A data point is displayed on the X-Y graph 309 for each path, and certain threshold values selected by the user are indicated by threshold lines 326 and 328.

Because the threshold crossing event is still ongoing at the selected time of 18:00, the node at which this event is occurring is highlighted in yellow 252 in the route panel 204. A threshold crossing event icon 280 also appears near the affected interface.

In FIG. 4, the user has manipulated a horizontal scroll bar 412 of the route panel 204 to display an end portion of the selected route.

In FIG. 5, the user has moved the route panel 204 display back to show the start portion of the selected route, and has left-clicked on the link connecting node tCARr2 252 and tCARr5 414 to open a link information window 282 displaying information about the selected link. In this case, the link provides a conduit between interfaces identified as FDDI.tCARr2 and FDDI1.tCARr5 284, the technology used for data transfer along the link is FDDI 286, the maximum speed for travel of data along the link is 100,000,000 bits per second (Bps) 288, the subnet within which the link is located has an IP address 47.50.0.0 290, the IP addresses for the interfaces joined by the link are 47.50.0.1 and 47.50.0.2 292, and the link connects the two route groups or sub-route groups 0.0.1.0 and 0.0.0.1 294.

In FIG. 6, the user has dragged the time slide-tab 347 to select a time of 14:20 as indicated by the time indicator 348. All data shown in the GUI 24 is then shown as of the time selected, 14:20. The X-Y graph 309 in the performance panel 206 shows data points for the paths at 14:20 and the paths panel 210 shows in solid, only those paths, 1 through 7, along which data has traveled between the start time of 10:10 and the selected time of 14:20, while the remainder of the paths, 8 through 15, are shown in ghost. Additionally, as indicated by the highlighting 372 of the critical/major alarm icon 368 and the path re-route icon 360 on the timebar 346, the selected time of 14:20 coincides with the time at which these two events were first detected. The heavier lines 370 extending along the timebar indicate the duration of these events. As certain events have occurred at the selected time, the paths affected by these events are highlighted in both the paths panel 210 and the route panel 204. In this case, it is paths 4 and 5 which are highlighted. In the paths panel 210, the box outline identifies the affected paths, while the coloured icons 420 and 422 beside the path numbers indicate the colours and patterns used to highlight the paths on the route panel 204. In this case, path 4, where the critical/major alarm and path re-route events were detected is shown in hatched purple, while path 5, a related path is shown in solid purple. In the highlighted paths 424 and 426 shown in the route panel 204, the direction of travel of data along those paths is shown by small arrows, 415 for example, appearing near each junction with a node. Upon reviewing both the route panel 204 and the paths panel 210, it is evident that in this case data was originally routed to travel along path 4, represented by the hatched purple line 424 in the route panel. However, as the data arrived at node bTURc3 416 an error occurred resulting in a critical/major alarm, as indicated by the red colour of node bTURc3, and the critical/major alarm icon 418 appearing by the node. As a result, the data was re-routed along path 5, as shown in the route panel 204 in solid purple 426. The data point 430 in the X-Y graph 309 in the performance panel 206 corresponding to path 5, is also coloured in solid purple, while the data point 428 in the X-Y graph corresponding to path 4 appears in hatched purple.

Figure 7:
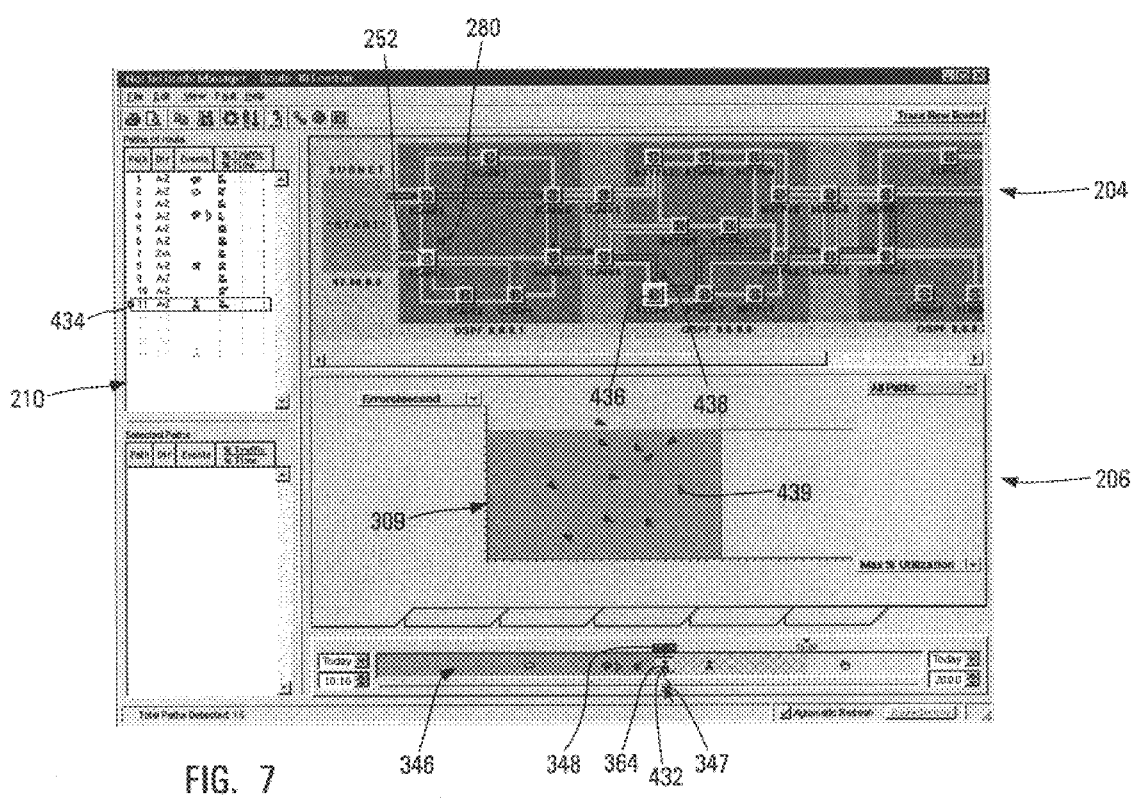
FIG. 7 is an illustration of the GUI of FIG. 3 with a time of 15:20 selected on the timebar.

In FIG. 7, the user has dragged the time slide-tab 347 to select a time of 15:20 as indicated by the time indicator 348. All data shown in the GUI 24 is then shown as of the time selected, 15:20. The X-Y graph 309 in the performance panel 206 shows data points for the paths at 15:20 and the paths panel 210 shows in solid, only those paths, 1 through 11, along which data has traveled between the start time of 10:10 and the selected time of 15:20. Additionally, as indicated by the highlighting 432 of the first software download icon 364 on the timebar 346 the selected time of 15:20 coincides with the time at which this event occurred. As an event has occurred at the selected time, the path affected by this event is highlighted in both the paths panel 210 and the route panel 204. In this case, it is path 11 which is highlighted. In the paths panel 210, the box outline identifies the affected path, while the coloured icon 434 beside the path number indicates the colour, in this case blue, used to highlight the path on the route panel 204. Additionally, in the route panel 204, the particular node 436 at which the event was detected is highlighted, and a software download event icon 438 appears nearby. The data point 439 in the X-Y graph 309 in the performance panel 206 corresponding to path 11, is also coloured in blue. As the threshold crossing event is still ongoing at the selected time of 15:20, the node affected by this ongoing event is highlighted 252 and a threshold crossing event icon 280 is displayed near the location of the event.

In FIG. 8, the user has moved the time slide-tab 347 back to 14:20, and has selected path 5 439 in the paths panel 210 by left-clicking on this path. When path 5 is selected, the corresponding return path, path 7 in this case, is also highlighted 440 and 442 in the paths 210 and route 204 panels respectively. As path 5 has been selected by the user, path 5 appears 444 in the selected-paths panel 212 along with its corresponding return path, path 7 446. The data points 430, 429 for the selected path and its corresponding return path respectively, are also highlighted on the X-Y graph 309 in the performance panel 206.

In FIG. 9, the user has selected the node at which the critical/major alarm occurred, identified as bTURc3 416, to see more details about the affected node. This node has been selected by left-clicking on the icon 416 representing the node. Upon selecting this node, a node information window 296 appears displaying information about the node. In this case, the node name is bTURc3 298, the node is a BayRouter type 300, the names assigned to the interfaces of this node associated with the relevant path are ATM0 and ATM1 302, the node is located between the subnets with the IP addresses 47.27.48.0 and 47.48.60.0 304, the IP addresses of the interfaces of this node associated with the relevant path are 47.27.48.1 and 47.48.60.1 306 and the maximum speed at which data may be transferred through the two relevant interfaces are 155,000,000 Bps, or 155 Mbps 308. Upon selecting the node 416, the node becomes highlighted.

Figure 10:
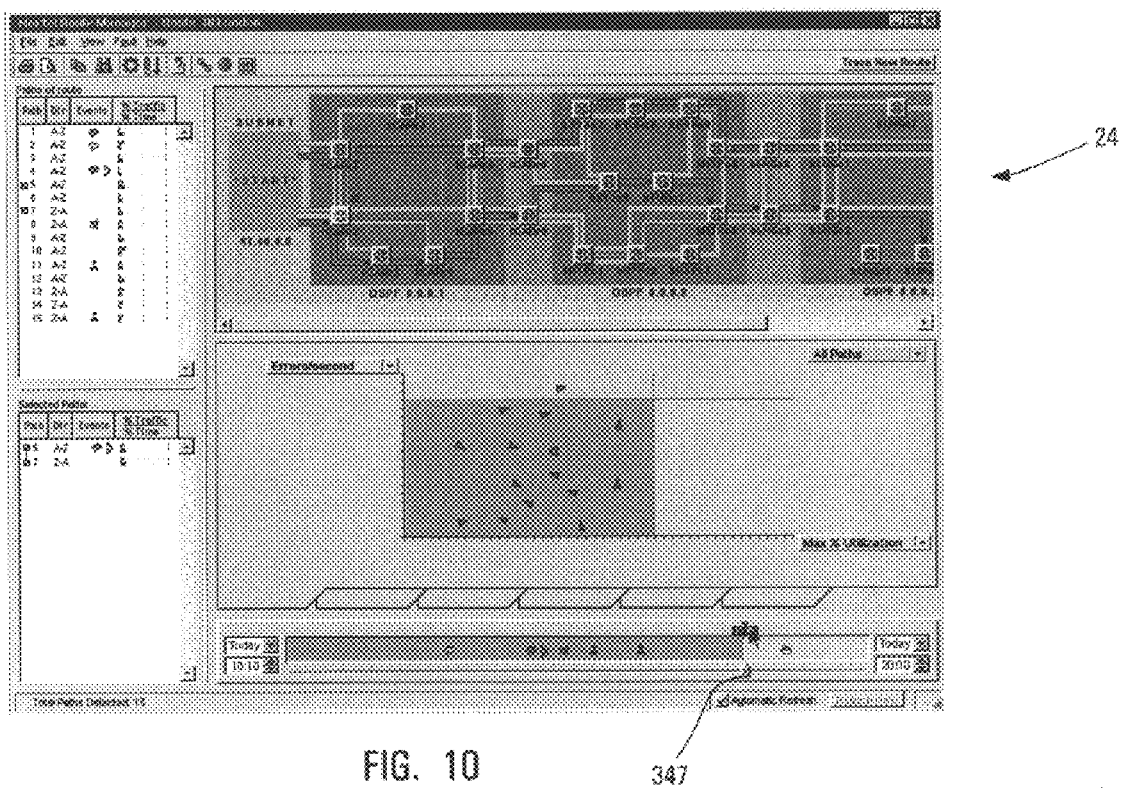
FIG. 10 is an illustration of the GUI of FIG. 8 with a time of 18:00 selected on the timebar.

In FIG. 10, the user has moved the time slide-tab 347 to select the current time of 18:00. The remainder of the GUI 24 has therefore been updated to this time while the previously selected paths, path 5 and its corresponding return path, path 7 remain selected in the various panels.

In FIG. 11, the user has left-clicked on the threshold crossing event icon 362 on the timebar 346, in response to which an event information window 374 has appeared. In this case, the event information window 374 indicates that the event is a threshold crossing 378; the event is still ongoing at the selected time 380; the severity of the event is minor 382; the reason for the alarm is that a node event sensor (ES) has detected that a predetermined threshold for some parameter has been exceeded 384; the date and time at which the event was first detected was at 14:50:04 on Tuesday, January 11 386; this event has been detected by the event sensor or "trap" 34 times 388; the affected interface is FDDI.tCARr2 390; and the IP address for the subnet in which the event occurred is 47.50.0.0 392.

In FIG. 12, the user has right-clicked on the threshold crossing event icon 362 on the timebar 346, in response to which an event options menu 394 has appeared. As noted above, the user has the option of obtaining more details about the affected node 396, opening the alarm manager application 398 or obtaining further help regarding the selected event.

Figure 13:
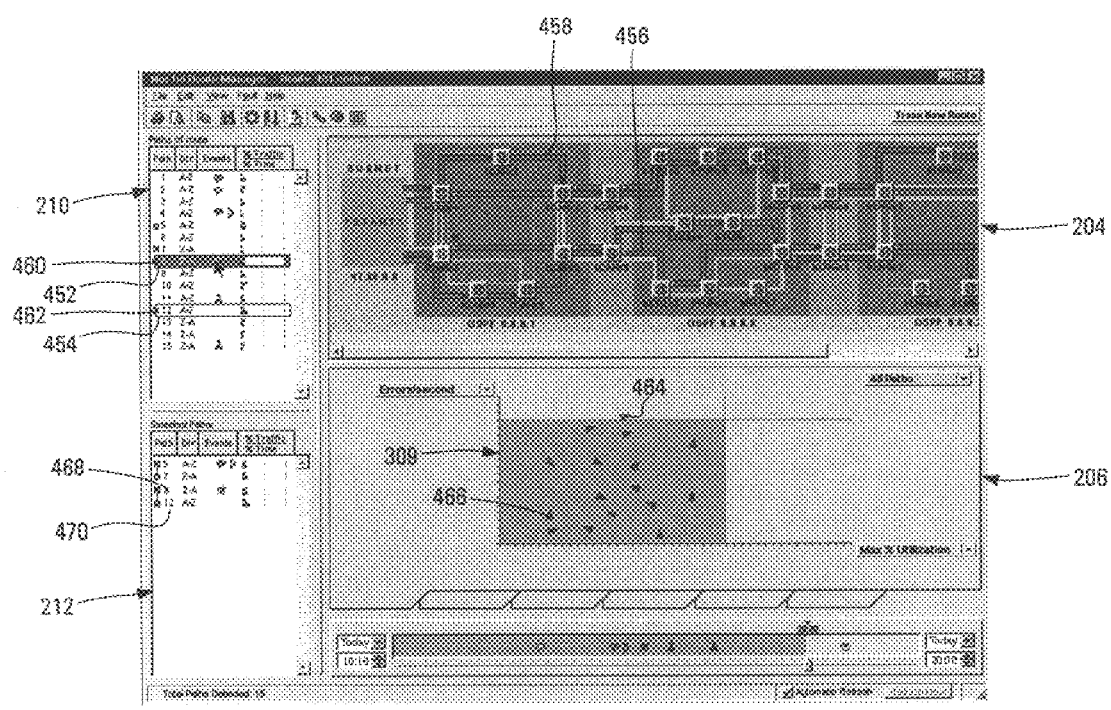
FIG. 13 is an illustration of the GUI of FIG. 10 with path 8 selected in the paths panel.

In FIG. 13, the user has selected path 8 452 in the paths panel 210. In doing so, path 8 has been highlighted in the paths panel 210 in a distinguishing colour, in this case, red. Also, path 12 454, the return path corresponding to path 8 is also highlighted. On the route panel 204, paths 8 and 12 are highlighted in red, 456 and 458 respectively, corresponding to the colour of the icons 460 and 462 appearing in front of the path numbers on the paths panel 210. The data points 464 and 466 on the X-Y graph 309 in the performance panel 206 corresponding to paths 8 and 12 are likewise highlighted in red. Finally, since paths 8 and 12 have now been selected, these paths appear 468 and 470 in the selected-paths panel 212.

In FIG. 14, the user has pulled down the pull-down menu associated with the dataset indicator 318 in the performance panel 206, and is about to select "Selected Paths" 472.

In FIG. 15, having now selected "Selected Paths" in the dataset indicator 318 in the performance panel 206, the X-Y graph 309 now displays data points 474, 476, 464 and 466 for only the four paths selected—paths 5, 7, 8 and 12 respectively. The user has also now opened the pull-down menu associated with the horizontal axis parameter indicator 314 and is about to select "Time" 478 for the horizontal axis.

In FIG. 16, having now selected "Time" for the horizontal axis, the X-Y graph 309 now displays a plot of the number of errors per second occurring for the selected paths, plotted over the time period selected on the timebar 346.

Figure 17:
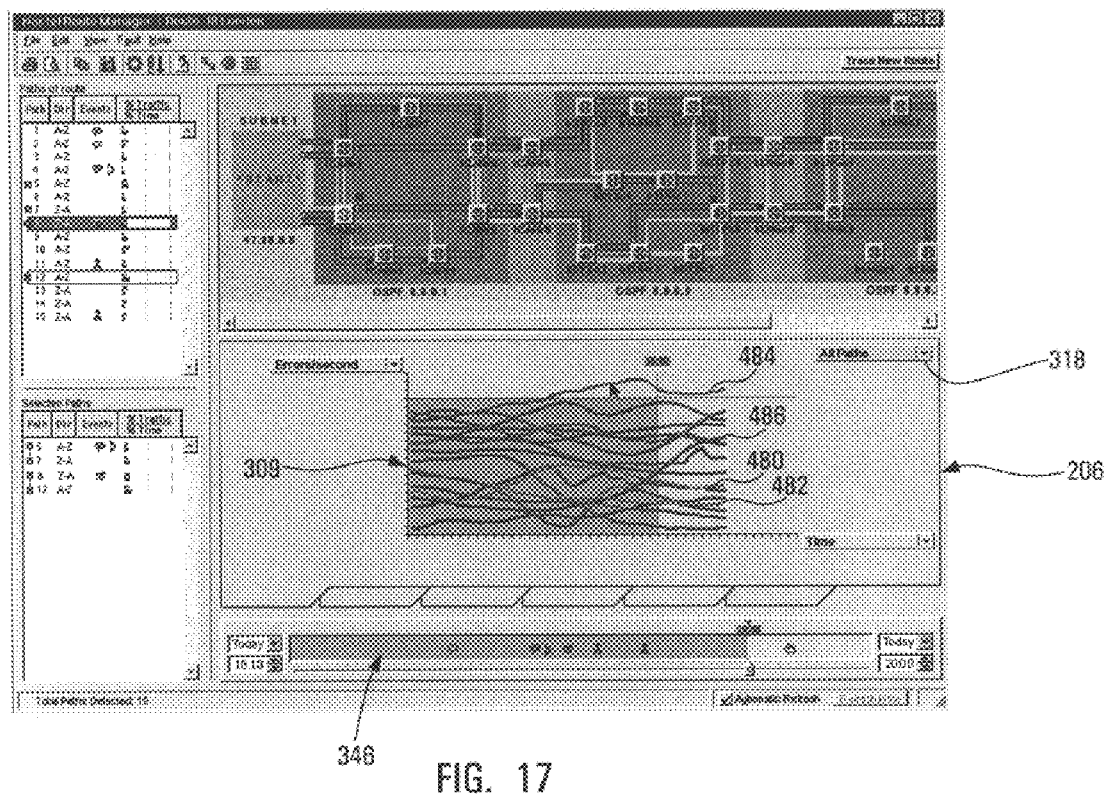
FIG. 17 is an illustration of the GUI of FIG. 16 with "All Paths" selected in the dataset indicator pull-down menu of the performance panel.

In FIG. 17, the user has selected "All Paths" in the dataset indicator 318 in the performance panel 206, and the X-Y graph 209 now displays a plot of the number of errors per second occurring for all paths, plotted over the time period selected on the timebar 346, with the data lines 480, 482, 484 and 486 respectively for the four selected paths 2, 7, 8 and 12 highlighted in their respective identifying colours.

In FIG. 18, the user has selected the data line 484 corresponding to path 8, on the X-Y graph 309 in the performance panel 206, and as a result, this data line has been highlighted. The user has selected this data line as it shows that a set threshold has been crossed for errors/second by this path.

In FIG. 19, the user has selected another data line 488 on the X-Y graph 309 in the performance panel 206. In this demonstration, the user has selected this data line 488 since although the associated path has not crossed the predetermined errors/second threshold 326, it has approached it a number of times and the user would like to inspect this path more closely.

In FIG. 20, the user has selected "Selected Paths" in the dataset indicator 318 in the performance panel 206 causing the GUI 24 to replace the former selected paths with the paths associated with the two data lines 484 and 488 now selected on the X-Y graph 309 in the performance panel 206. In the X-Y graph 309, the first selected data line 484 now appears in red, indicating that all data associated with that data line will now appear in red in the GUI 24. Similarly, the second selected data line 488 now appears in blue, indicating that all data associated with that data line will now appear in blue. Two further data lines 490 and 492 appear in the X-Y graph 309 corresponding with the return paths for the two paths corresponding to the selected data lines 484 and 488 respectively. All other data lines in the X-Y graph 309 have disappeared. In the paths panel 210, the paths corresponding to the selected data lines 484 and 488 are highlighted 494 and 496 respectively, and are identified as paths 8 and 13 respectively. The return paths 498, 500 are identified by coloured icons appearing before paths 12 and 6. In the selected-paths panel 212, the two selected paths as well as their associated return paths appear. Finally, in the route panel 204, paths 8, 12, 13 and 6 are shown in their identifying colours 456, 458, 502 and 504 respectively.

In FIG. 21, the user has moved the particular pane of the performance panel 206 showing the X-Y graph 309 selected by the user to the centre of the GUI 24 by clicking on the tab 332 at the bottom of the panel, and dragging the pane. This would allow, for example, comparison of two X-Y graphs side by side.

Figure 22:
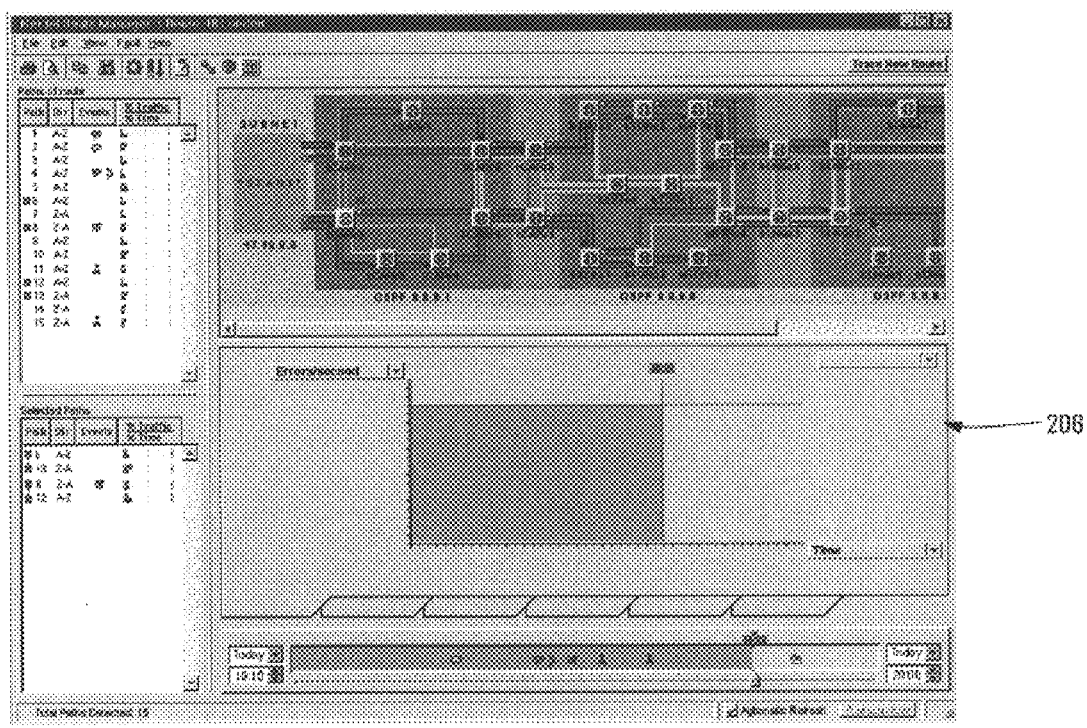
FIG. 22 is an illustration of the GUI of FIG. 21 with the selected window of FIG. 21 closed.

In FIG. 22, the pane of the performance panel 206 identified above has been closed, and a fresh pane of the performance panel is shown.

Figure 23:
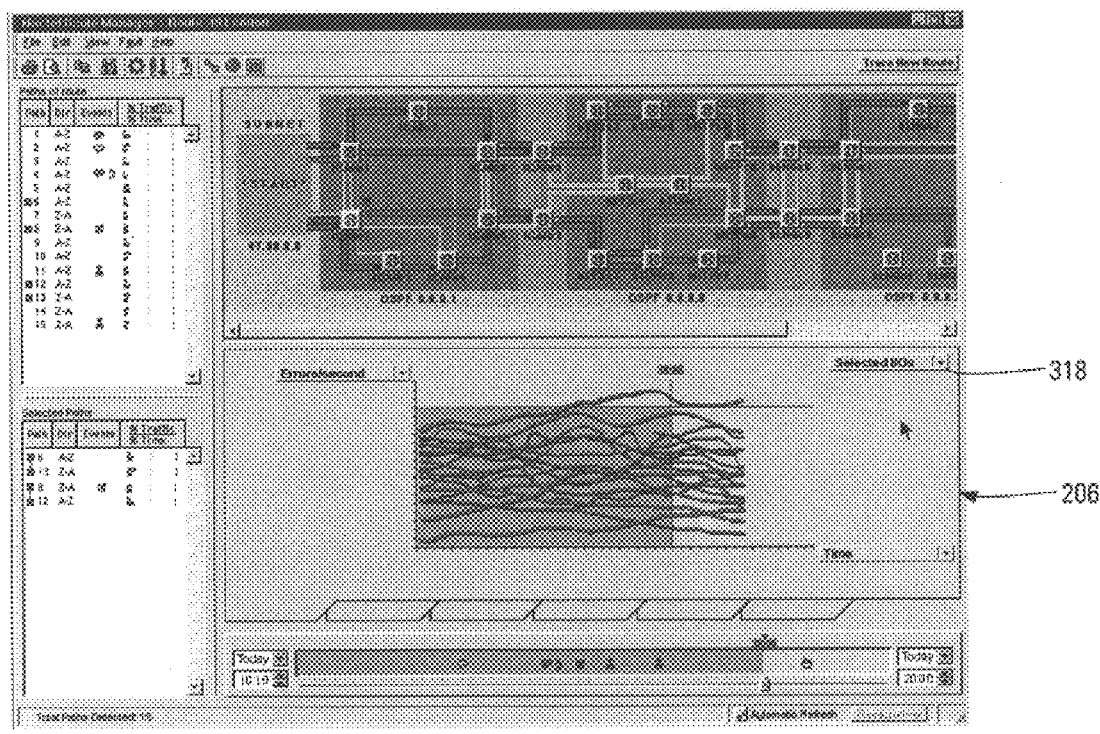
FIG. 23 is an illustration of the GUI of FIG. 22 with "Selected I/Os" selected in the dataset indicator pull-down menu of the performance panel.

In FIG. 23, the user has selected "Selected I/Os" in the dataset indicator 318 in the performance panel 206 to display errors/second vs. time plots for each node interface associated with each of the four selected paths. The path with which each of the data lines is associated is identified by the colour of the data line.

Figure 24:
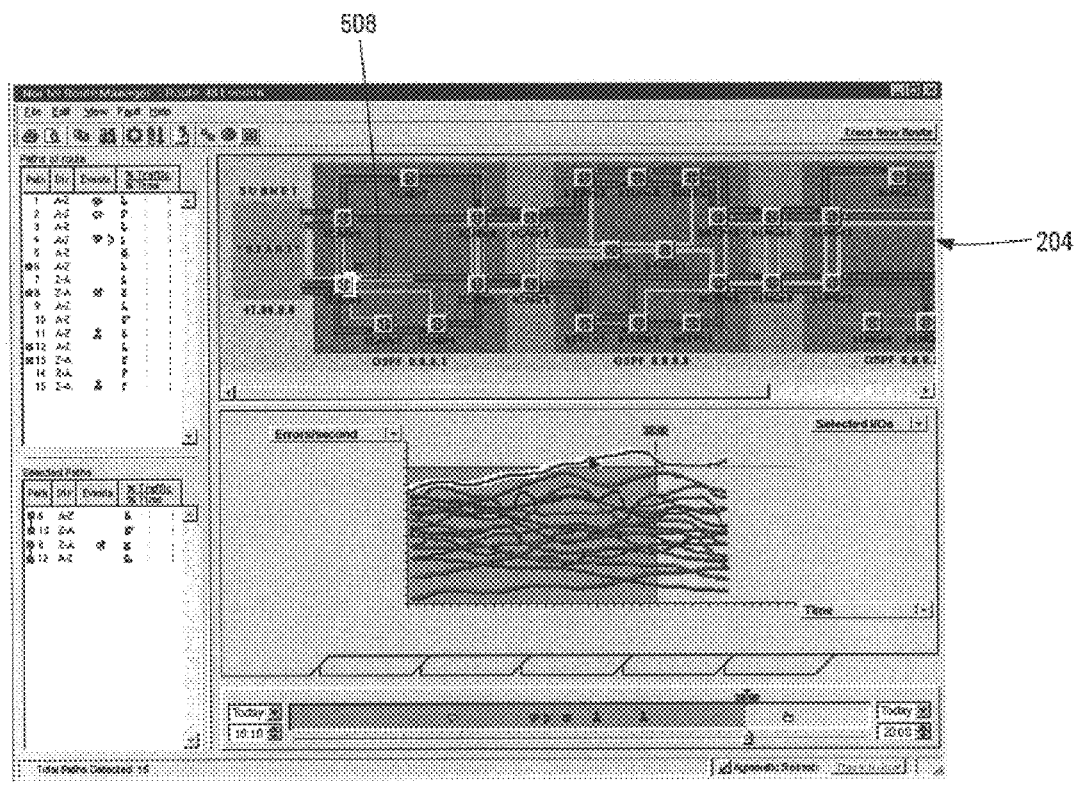
FIG. 24 is an illustration of the GUI of FIG. 23 with the top-most data line selected in the performance panel.

In FIG. 24, the user has left-clicked on one of the data lines 506 in an effort to identify the interface associated with the data line. A particular interface 508 has therefore been highlighted in the route panel 204.

Figure 25:
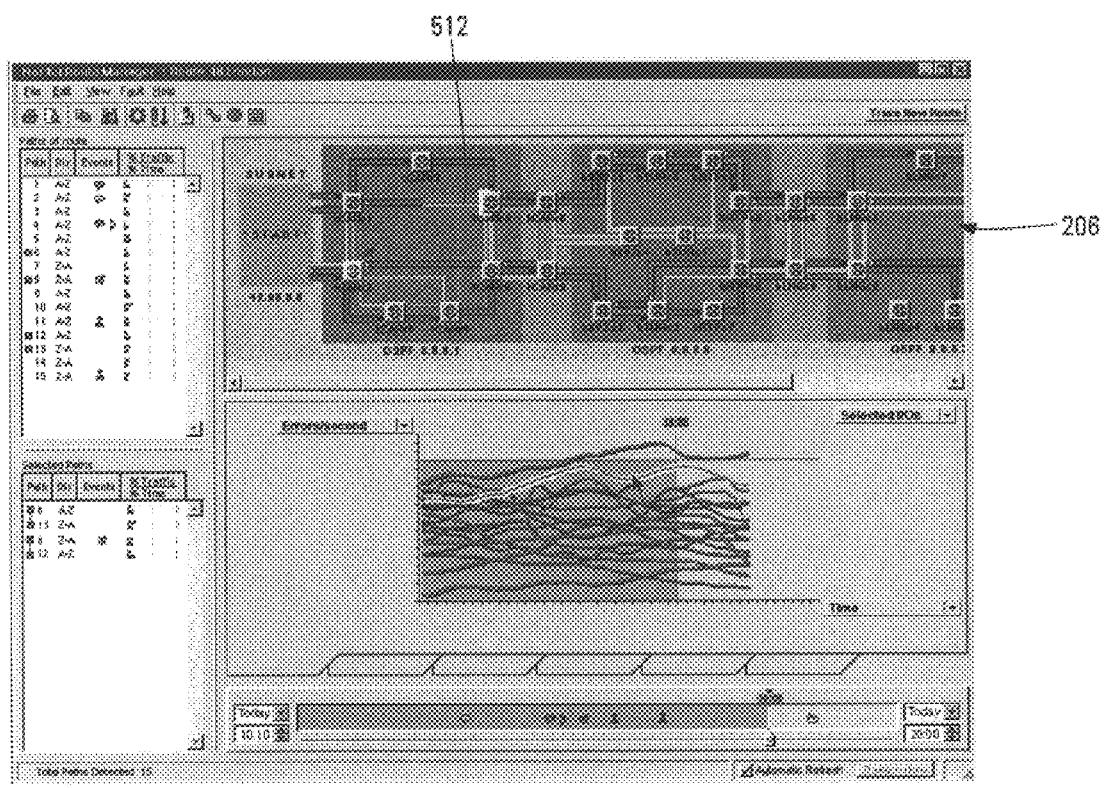
FIG. 25 is an illustration of the GUI of FIG. 23 with the second-from-the-top data line selected in the performance panel.

In FIG. 25, the user has left-clicked on another of the data lines 510 in an effort to identify the interface associated with it. Another interface 512 has been highlighted in the route panel 204.

It is to be understood that although the appearance and functionality of the GUI of the present invention has been described in detail with regard to the preferred embodiment GUI, it will be understood by a person skilled in the art that variations may be made to both the appearance and the functionality without departing from the scope of the present invention.

It is further to be understood that the data displayed in FIGS. 3 through 25 are for illustrative purposes only, and that other data may be displayed in the GUI of the present invention.

While the preferred embodiment GUI 24 has been described and illustrated in relation to an IP network, the GUI of the present invention may be used in connection with any communications network in which data may travel between the start and end points of a given route through multiple paths, cellular communication networks for example.

Although the preferred embodiment GUI 24 has been described and illustrated as having a header 200, a footer 202, and each of the route panel 204, performance panel 206, time panel 208, paths panel 210 and selected-paths panel 212 in particular locations, it is to be understood that these elements may appear in the GUI 24 in any configuration, and indeed, one or more of these elements may be removed, or others added. For example, the paths panel may only display paths on the route in a forward direction while another new panel displays paths on the route in a backward direction.

Although the preferred embodiment GUI 24 has been described above and illustrated in the figures, having particular colours and particular levels of highlighting or shading for various features and elements, it is to be understood that different colours and different levels of shading may be used for these features and elements. Additionally, although selected elements are shown and described as being visually distinguished using particular distinguishing characteristics, highlighting or colour for example, it is to be understood that other methods of visual distinction may be used, displaying a circle or box around the feature or element, for example.

The above described embodiments have focussed mainly on a method in a computer system for displaying route and path information. In addition, an embodiment of the invention also provides for a software program containing software which when run will implement one or more of the above discussed methods, stored on a computer readable medium. Another embodiment of the invention provides a computer system per se adapted to implement one or more of the above discussed methods. Furthermore, in another embodiment, a graphical user interface is provided which has been adapted to implement one or more of the above discussed methods.

Numerous modifications and variations of the present invention are possible in light of the above teachings. It is therefore to be understood that within the scope of the appended claims, the invention may be practiced otherwise than as specifically described herein.

The embodiments of the invention in which an exclusive property or privilege is claimed are defined as follows:

1. A method for managing a network in which a route from a first point to a second point takes different paths comprising:
    collecting device-level status and performance information from the network;
    transforming the device-level status and performance information into path and route information;
    computing parameters which characterize the state of each of a plurality of paths on the route; and
    displaying the parameters of each of the plurality of paths graphically.

2. A method according to claim 1 wherein displaying the parameters of each of a plurality of paths graphically comprises:
    graphically displaying in a route panel, a structure of the plurality of paths comprising the route.

3. The method of claim 2 wherein the structure of the plurality of paths comprising the route is graphically displayed by displaying graphical representations of the first point and the second point, as well as graphical representations of nodes and links comprising the paths.

4. The method of claim 3 wherein the graphical displaying in the route panel is done as a function of a selected time, the method further comprising displaying a timebar graphically representing time between a start time/date and an end time/date, the timebar visually communicating the selected time.

5. The method of claim 4 further comprising displaying on the timebar, network event icons pictorially representing network events and whose location along the timebar visually communicates a time at which the network events were first detected.

6. The method of claim 4 further comprising displaying in a paths panel, information respecting each of the paths taken by data traveling on the route between the start time/date and the end time/date, in a tabular format.

7. The method of claim 6 further comprising displaying a performance panel displaying performance characteristics of the route.

8. The method of claim 7 further comprising displaying in the performance panel, a horizontal axis, a vertical axis, and data indicia representing performance characteristics of the route.

9. The method of claim 8 further displaying a horizontal axis parameter indicator, a vertical axis parameter indicator, and a dataset indicator, the data indicia comprising plots of the parameter displayed in the vertical axis parameter indicator, as a function of the parameter displayed in the horizontal axis parameter indicator, for the dataset displayed in the dataset indicator.

10. The method of claim 7 further comprising displaying a selected paths panel, wherein upon selection of a path in either one of the paths panel and the performance panel, information respecting the selected path is displayed in the selected paths panel in a tabular format.

11. The method of claim 3 further comprising displaying a performance panel graphically displaying performance characteristics of the route.

12. A computer system adapted to implement the method of claim 1.

13. A graphical user interface adapted to implement the method of claim 1.

14. A computer readable medium having software stored thereon for instructing a computer to implement the method of claim 1.

15. A method in a computer system for displaying network management information for a route on a network, the route having a plurality of paths between a first point and a second point, each path being comprised of a plurality of nodes and links, the method comprising:
    determining path and route information from collected device-level status and performance information from a network;
    computing parameters which characterize the state of each of a plurality of paths on a route; and
    graphically displaying in a route panel, a structure of the plurality of paths comprising the route and the state parameters of each of the plurality of paths as a function of time.

16. The method of claim 15 wherein the structure of the plurality of paths comprising the route is graphically displayed by displaying graphical representations of the first point and the second point, as well as graphical representations of the nodes and links comprising the paths.

17. The method of claim 16 wherein the graphical display of the structure of the plurality of paths comprising the route visually communicates the number of links between any two nodes.

18. The method of claim 17 wherein the number of links between any two nodes is visually communicated by displaying a corresponding number of link lines between the graphical representations of the two nodes.

19. The method of claim 16 wherein the graphical display of the structure of the paths comprising the route visually communicates a relative traffic level on each link.

20. The method of claim 19 wherein the relative traffic level on each link is communicated by displaying a link line whose thickness is proportional to the relative traffic level on the link.

21. The method of claim 16 wherein the graphical representations of the nodes are spatially grouped according to logical groupings within which each of the nodes is located, and each spatial grouping is visually identified.

22. The method of claim 16 wherein the graphical displaying in the route panel is done as a function of a selected time, further comprising visually communicating a location on the route of any ongoing network event at the selected time.

23. The method of claim 22 wherein the location of any ongoing network event at the selected time is communicated by visually distinguishing the corresponding graphical representation.

24. The method of claim 16 wherein the graphical displaying in the route panel is done as a function of a selected time, the method further comprising displaying a timebar graphically representing time between a start time/date and an end time/date, the timebar visually communicating the selected time.

25. The method of claim 24 wherein the selected time is indicated by a location of a slide-tab along the timebar.

26. The method of claim 25 wherein a new selected time is selected by dragging the slide-tab along the timebar to a location representing the desired time.

27. The method of claim 24 wherein the start time/date and end time/date may be changed.

28. The method of claim 24 further comprising displaying on the timebar, network event icons pictorially representing network events and whose location along the timebar visually communicates a time at which the network events were first detected.

29. The method of claim 28 wherein if the selected time coincides with the time at which a network event is first detected, the network event icon corresponding to the network event is visually distinguished.

30. The method of claim 29 wherein if the selected time coincides with the time at which a network event is first detected, the graphical representations of a portion of the route affected by the network event is visually distinguished in the route panel.

31. The method of claim 30 wherein the graphical representations of the portion of the route affected by the network event is visually distinguished using a distinguishing characteristic.

32. The method of claim 28 wherein if the selected time coincides with the time at which a network event is first detected, a duration of the network event is visually communicated on the timebar.

33. The method of claim 24 further comprising displaying in a paths panel, information respecting each of the paths taken by data traveling on the route between the start time/date and the end time/date, in a tabular format.

34. The method of claim 33 wherein those paths taken by data traveling on the route between the start time/date and the selected time are visually distinguished from the other paths displayed in the paths panel.

35. The method of claim 34 wherein those paths taken by data traveling on the route between the start time/date and the selected time appear in solid, while the other paths displayed in the paths panel appear in ghost.

36. The method of claim 33 wherein if the selected time coincides with the time at which a network event is first detected, the path affected by the network event is visually distinguished in the paths panel.

37. The method of claim 36 wherein if the selected time coincides with the time at which a network event is first detected, the path affected by the network event is visually distinguished in the paths panel using a distinguishing characteristic, and the graphical representations of a portion of the route affected by the network event is visually distinguished using the same or similar distinguishing characteristic in the route panel.

38. The method of claim 33 wherein upon selection of a path in the paths panel, the selected path is visually distinguished in the paths panel using a distinguishing characteristic.

39. The method of claim 38 wherein upon selection of a path in the paths panel, the graphical representations of the links comprising the selected path are visually distinguished using the same or similar distinguishing characteristic in the route panel.

40. The method of claim 38 wherein upon selection of a path in the paths panel, any corresponding return paths are also visually distinguished in the paths panel using the same or similar distinguishing characteristic.

41. The method of claim 40 wherein upon selection of a path in the paths panel, the graphical representations of the links comprising both the selected path and any corresponding return paths are visually distinguished in the route panel.

42. The method of claim 33 wherein the paths panel displays network event icons graphically representing network events which have occurred on each path between the start time/date and the end time/date.

43. The method of claim 33 further comprising displaying a performance panel displaying performance characteristics of the route.

44. The method of claim 43 further comprising displaying in the performance panel, a horizontal axis, a vertical axis, and data indicia representing performance characteristics of the route.

45. The method of claim 44 further displaying a horizontal axis parameter indicator, a vertical axis parameter indicator, and a dataset indicator, the data indicia comprising plots of the parameter displayed in the vertical axis parameter indicator, as a function of the parameter displayed in the horizontal axis parameter indicator, for the dataset displayed in the dataset indicator.

46. The method of claim 45 wherein the parameters displayed in each of the horizontal and vertical axis parameter indicators may be changed.

47. The method of claim 45 wherein the dataset displayed in the dataset indicator may be changed.

48. The method of claim 47 wherein upon selection of any of the data indicia in the performance panel, the selected data indicia are visually distinguished using a distinguishing characteristic, and upon subsequently changing the dataset displayed in the dataset indicator to one which shows only the selected data, any data indicia not selected disappears.

49. The method of claim 48 wherein upon selection of any of the data indicia in the performance panel, and upon subsequently changing the dataset displayed in the dataset indicator to one which shows only the selected data, any paths associated with the selected data indicia are visually distinguished in the paths panel using the same or similar distinguishing characteristic, and graphical representations of any portion of the route represented by the selected data indicia are also visually distinguished in the route panel using the same or similar distinguishing characteristic.

50. The method of claim 44 wherein the data indicia communicate an instantaneous direction in which each data point represented by each data indicia is moving at the selected time.

51. The method of claim 44 further comprising displaying in the performance panel, lines representing predetermined thresholds for the parameters displayed in at least one of the horizontal and vertical axis parameter indicators.

52. The method of claim 43 further comprising displaying a selected paths panel, wherein upon selection of a path in either one of the paths panel and the performance panel, information respecting the selected path is displayed in the selected paths panel in a tabular format.

53. The method of claim 16 further comprising displaying a performance panel displaying performance characteristics of the route.

54. The method of claim 53 further comprising displaying in the performance panel, a horizontal axis, a vertical axis, and data indicia representing performance characteristics of the route.

55. The method of claim 54 further displaying a horizontal axis parameter indicator, a vertical axis parameter indicator, and a dataset indicator, the data indicia comprising plots of the parameter displayed in the vertical axis parameter indicator, as a function of the parameter displayed in the horizontal axis parameter indicator, for the dataset displayed in the dataset indicator.

56. The method of claim 55 wherein the parameters displayed in each of the horizontal and vertical axis parameter indicators may be changed.

57. The method of claim 55, wherein the dataset displayed in the dataset indicator may be changed.

58. The method of claim 57 wherein upon selection of any of the data indicia in the performance panel, the selected data indicia are visually distinguished using a distinguishing characteristic, and upon subsequently changing the dataset displayed in the dataset indicator to one which shows only the selected data, any data indicia not selected disappears.

59. The method of claim 58 wherein upon selection of any of the data indicia in the performance panel, and upon subsequently changing the dataset displayed in the dataset indicator to one which shows only the selected data, any graphical representations of any portion of the route represented by the selected data indicia are visually distinguished in the route panel using the same or similar distinguishing characteristic.

60. The method of claim 54 wherein the data indicia communicate an instantaneous direction in which each data point represented by each data indicia is moving at the selected time.

61. The method of claim 54 further comprising displaying in the performance panel, lines representing predetermined thresholds for the parameters displayed in at least one of the horizontal and vertical axis parameter indicators.

62. A computer system adapted to implement the method of claim 15.

63. A graphical user interface adapted to implement the method of claim 15.

64. A computer readable medium having software stored thereon for instructing a computer to implement the method of claim 15.

65. A method in a computer system for displaying network events information for a network, the method comprising:

determining path and route information from collected device-level status and performance information from a network;

computing parameters which characterize the state of each of a plurality of paths on a route as a function of time;

displaying a timebar graphically representing time between a start time/date and an end time/date;

displaying on the timebar, network event icons pictorially representing network events occurring in the network in connection with the plurality of paths, and whose location along the timebar visually communicates the time at which they are first detected.

66. A computer system adapted to implement the method of claim 65.

67. A graphical user interface adapted to implement the method of claim 65.

68. A computer readable medium having software stored thereon for instructing a computer to implement the method of claim 65.

69. A network management system comprising:

a network management interface device operable to collect device-level status and performance information from a network;

one or more processing devices operable to transform the device-level status and performance information into path and route information and to compute from the path and route information parameters which characterize the state of each of a plurality of paths on a route; and a graphical user interface for displaying the parameters of each of a plurality of paths graphically.

* * * * *